United States Patent
Castellucci et al.

(10) Patent No.: US 12,301,000 B2
(45) Date of Patent: May 13, 2025

(54) HEAT-OF-COMPRESSION RECYCLE SYSTEM, AND SUB-SYSTEMS THEREOF

(71) Applicant: Highview Enterprises Limited, London (GB)

(72) Inventors: Nicola Castellucci, Woking (GB); Colm John Cochrane, London (GB)

(73) Assignee: Highview Enterprises Limited, London (GB)

( * ) Notice: Subject to any disclaimer, the term of this patent is extended or adjusted under 35 U.S.C. 154(b) by 1170 days.

(21) Appl. No.: 16/969,385

(22) PCT Filed: Feb. 13, 2019

(86) PCT No.: PCT/GB2019/050389
§ 371 (c)(1),
(2) Date: Aug. 12, 2020

(87) PCT Pub. No.: WO2019/158921
PCT Pub. Date: Aug. 22, 2019

(65) Prior Publication Data
US 2020/0400372 A1  Dec. 24, 2020

(30) Foreign Application Priority Data

Feb. 13, 2018 (GB) ..................... 1802359

(51) Int. Cl.
*H02J 15/00* (2006.01)
*F25J 1/00* (2006.01)
(Continued)

(52) U.S. Cl.
CPC .............. *H02J 15/00* (2013.01); *F25J 1/0037* (2013.01); *F25J 1/005* (2013.01); *F25J 1/0202* (2013.01);
(Continued)

(58) Field of Classification Search
CPC .......... F25J 1/0037; F25J 1/005; F25J 1/0202; F25J 1/0224; F25J 1/0242; F25J 2270/06
See application file for complete search history.

(56) References Cited

U.S. PATENT DOCUMENTS

| 3,451,342 A | 6/1969 | Schwartzmann | |
|---|---|---|---|
| 2010/0107634 A1* | 5/2010 | Xu | F17C 9/04 60/671 |

(Continued)

FOREIGN PATENT DOCUMENTS

| CN | 101915224 A | 12/2010 |
|---|---|---|
| CN | 106089336 A | 11/2016 |

(Continued)

OTHER PUBLICATIONS

Zhang et al. (CN20162136779U), English Translation, Novel liquified air energy storage system, 2016, Whole Document (Year: 2016).*

(Continued)

*Primary Examiner* — Larry L Furdge
*Assistant Examiner* — Keith Stanley Myers
(74) *Attorney, Agent, or Firm* — Meunier Carlin & Curfinan LLC

(57) ABSTRACT

A power recovery sub-system for a cryogenic energy storage system, the sub-system comprising: a first and a second thermal energy storage device (TESD); a first, a second and a fourth heat exchanger (HEX); a first, a second and a fourth expansion stage; a first arrangement of conduits, having an upstream end and a downstream end, and configured to pass a working fluid through the first HEX, the first expansion stage, the second HEX, and the second expansion stage; a second arrangement of conduits configured to pass a first heat transfer fluid from the first TESD, through the first and the second HEX; and a third arrangement of conduits configured to pass a second heat transfer fluid from the (Continued)

second TESD, through the fourth HEX, wherein the first arrangement of conduits is configured to pass the working fluid through the fourth HEX and the fourth expansion stage.

25 Claims, 18 Drawing Sheets

(51) Int. Cl.
  *F25J 1/02* (2006.01)
  *H02J 3/28* (2006.01)
(52) U.S. Cl.
  CPC .......... *F25J 1/0224* (2013.01); *F25J 1/0242* (2013.01); *F25J 2210/62* (2013.01); *F25J 2230/30* (2013.01); *F25J 2270/06* (2013.01); *H02J 3/28* (2013.01)

(56) References Cited

U.S. PATENT DOCUMENTS

| | | | |
|---|---|---|---|
| 2014/0245756 A1* | 9/2014 | Morgan | F25J 1/0202 62/50.1 |
| 2015/0233247 A1 | 8/2015 | Haider et al. | |
| 2018/0320559 A1* | 11/2018 | Castellucci | F01K 7/02 |

FOREIGN PATENT DOCUMENTS

| | | | | |
|---|---|---|---|---|
| CN | 106481378 A | | 3/2017 | |
| CN | 206073566 U | | 4/2017 | |
| CN | 206267902 U | * | 6/2017 | |
| CN | 107542649 A | | 1/2018 | |
| EP | 3428425 A1 | | 1/2019 | |
| GB | 2534914 A | * | 8/2016 | ............ F02C 6/14 |
| GB | 2494400 B | | 11/2017 | |
| JP | 55146209 A | | 11/1980 | |
| JP | 2001193483 A | | 7/2001 | |
| JP | 2009528469 A | | 8/2009 | |
| JP | 2017160863 A | | 9/2017 | |
| JP | 2020543343 A | | 5/2021 | |
| WO | 2007096656 A1 | | 8/2007 | |
| WO | 2019158921 | | 8/2019 | |
| WO | WO 2019/158921 A1 | | 8/2019 | |

OTHER PUBLICATIONS

Invitation to Pay Additional Fees mailed Jun. 3, 2019 in connection with International Appliction No. PCT/GB2019/050389.
International Search Report and Written Opinion mailed Jul. 25, 2019 in connection with International Application No. PCT/GB2019/050389.
International Preliminary Report on Patentability mailed Aug. 18, 2020 in connection with International Application No. PCT/GB2019/050389.
Office Action dated Mar. 20, 2023, issued by the China National Intellectual Property Administration in corresponding Chinese Patent Application No. 201980021014.2, 19 pages.
PCT/GB2019/050389, Jun. 3, 2019, Invitation to Pay Additional Fees.
PCT/GB2019/050389, Jul. 25, 2019, International Search Report and Written Opinion.
PCT/GB2019/050389, Aug. 18, 2020, International Preliminary Report on Patentability.
Office Action dated Oct. 24, 2022, issued in corresponding Japanese Patent Application No. 2020-543343.
Communication Pursuant to Article 94(3) dated Mar. 4, 2022, issued in corresponding European Patent Application No. 19707072.5.
Examination Report dated Mar. 23, 2022, issued in corresponding Indian Patent Application No. 202027038992.

* cited by examiner

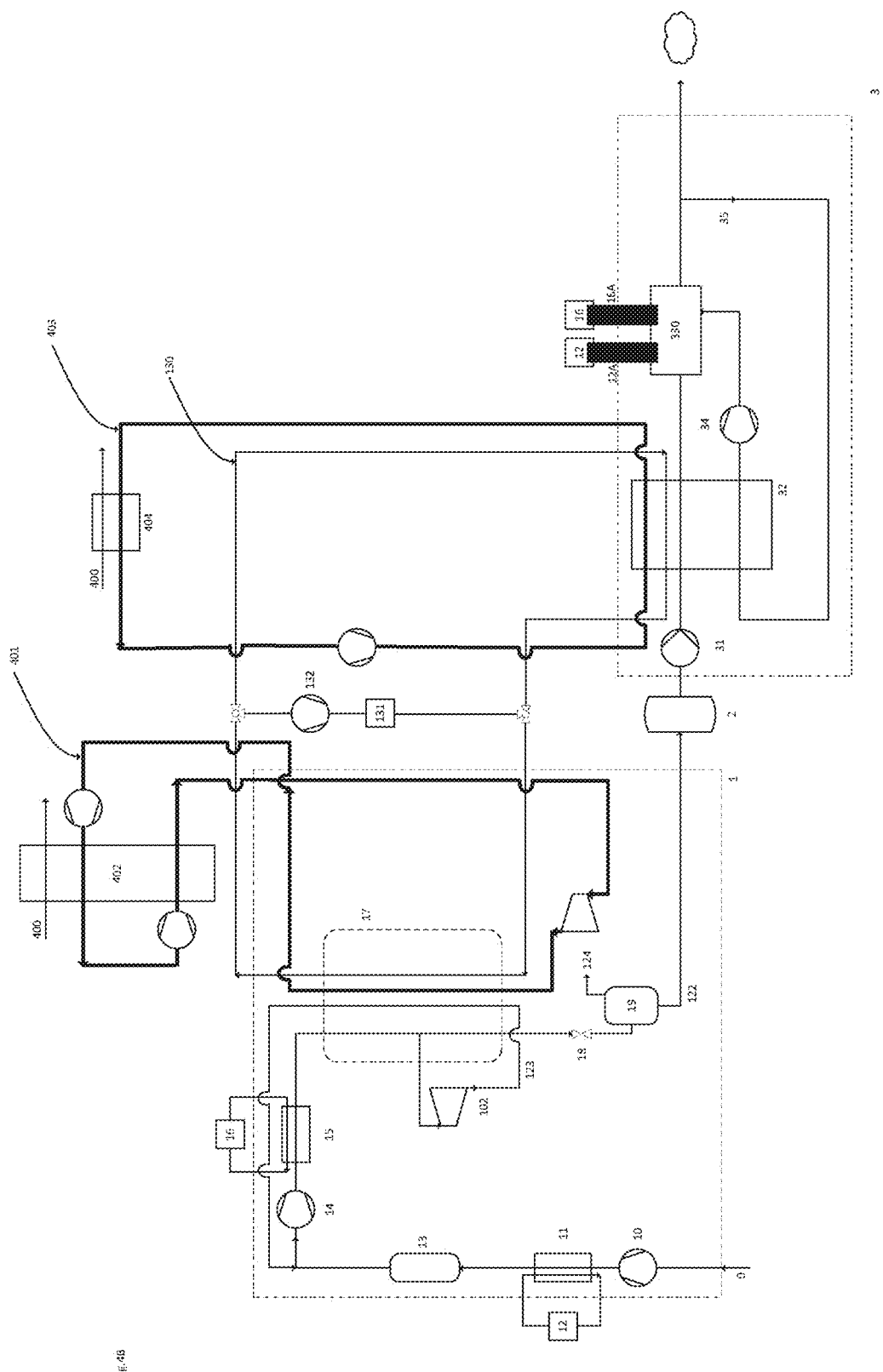

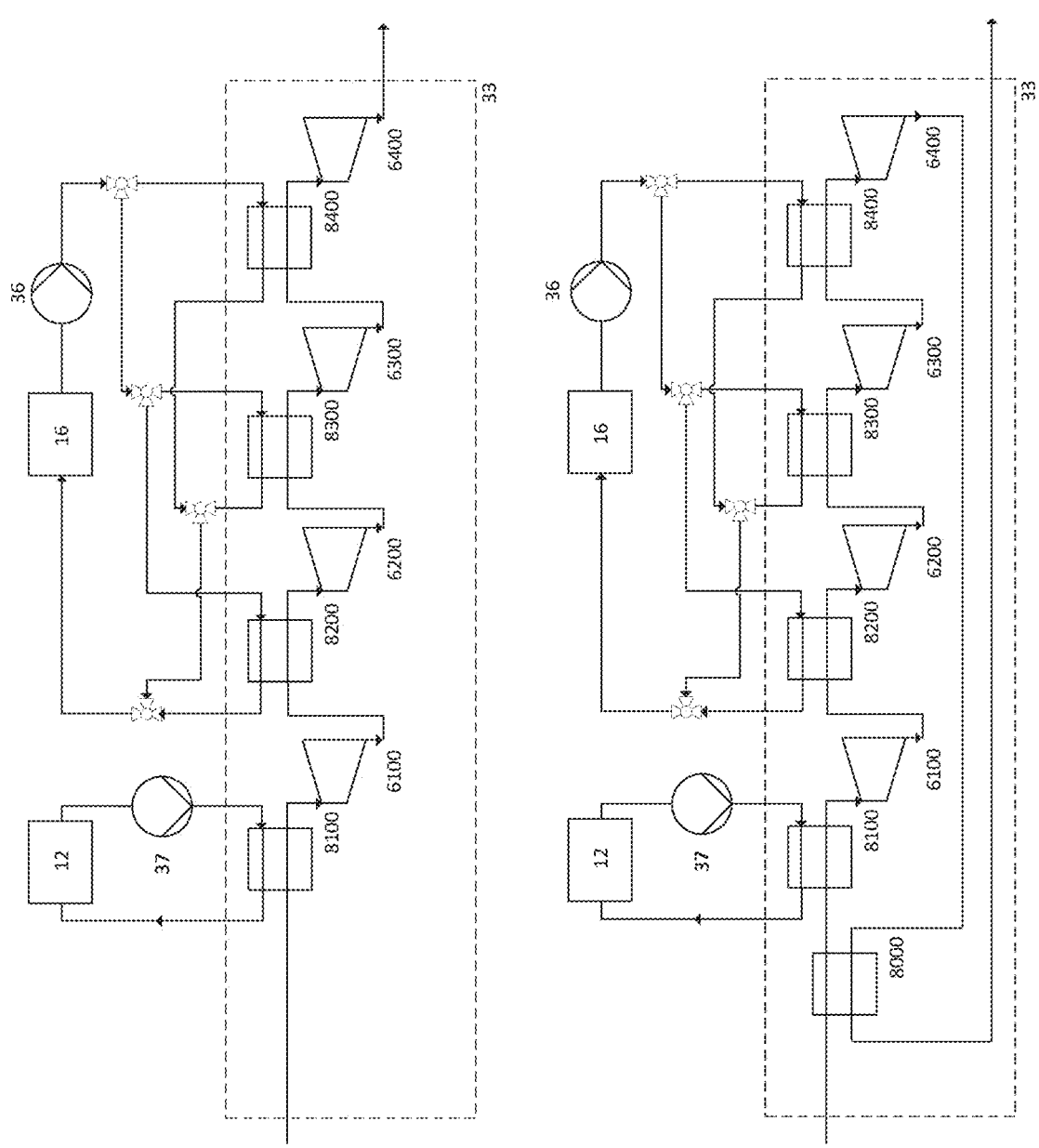

HEAT-OF-COMPRESSION RECYCLE SYSTEM, AND SUB-SYSTEMS THEREOF

FIELD OF THE INVENTION

The present invention relates to power recovery sub-systems and cryogenic energy storage systems with liquefaction and power recovery sub-systems, and particularly to systems and methods for capturing, storing and re-using hot thermal energy.

BACKGROUND OF THE INVENTION

Electricity transmission and distribution networks (or grids) must balance the generation of electricity with the demand from consumers. This is normally achieved by modulating the generation side (supply side) by turning power stations on and off, and running some at reduced load. As most existing thermal and nuclear power stations are most efficient when run continuously at full load, there is an efficiency penalty in balancing the supply side in this way. The expected introduction of significant intermittent renewable generation capacity, such as wind turbines and solar collectors, to the networks will further complicate the balancing of the grids, by creating uncertainty in the availability of parts of the generation fleet. A means of storing energy during periods of low demand for later use during periods of high demand, or during low output from intermittent generators, would be of major benefit in balancing the grid and providing security of supply.

Power storage devices have three phases of operation: charge, store and discharge. Power storage devices generate power (discharge) on a highly intermittent basis when there is a shortage of generating capacity on the transmission and distribution network. This can be signalled to the storage device operator by a high price for electricity in the local power market or by a request from the organisation responsible for the operating of the network for additional capacity. In some countries, such as the United Kingdom, the network operator enters into contracts for the supply of back-up reserves to the network with operators of power plants with a rapid start capability. Such contracts can cover months or even years but typically the time the power provider will be operating (generating power) is very short. This is illustrated in FIG. 1 which shows a typical operating profile for a storage device. In addition, a storage device can provide a supplementary service in providing additional load at times of oversupply of power to the grid from intermittent renewable generators. Wind speeds are often high overnight when demand is low. The network operator must either arrange for additional demand on the network to utilise the excess supply, through low energy price signals or specific contracts with consumers, or constrain the supply of power from other stations or wind farms. In some cases, especially in markets where wind generators are subsidised, the network operator will have to pay the wind farm operators to 'turn off' the wind farm. A storage device offers the network operator a useful additional load that can be used to balance the grid in times of excess supply.

For a power storage device to be commercially viable, the following factors must be taken into account: capital cost per MW (power capacity) and MWh (energy capacity), round trip cycle efficiency and lifetime with respect to the number of charge and discharge cycles that can be expected from the initial investment and its environmental impact (country-dependent regulations vis-à-vis its carbon footprint and its potential use or production of hazardous chemicals). For widespread utility scale applications, the power storage device should be deployable where it is needed in electrical networks. In other words, it should exhibit a small footprint and its working principle should not require specific geographic constraints such as the ones needed for hydroelectric power systems or compressed air energy storage devices.

Cryogenic energy storage technology using a cryogen such as liquid air offers a number of advantages over the other available power storage technologies. Cryogenic energy storage systems are typically energy dense due to the physical properties of liquid air, highly locatable (because they use relatively small storage tanks that are geographically unconstrained), environmentally friendly (because its working principle does not involve the use or production of hazardous material, or the generation of carbon emissions) and relatively inexpensive. In the charge or liquefaction phase, low cost electricity at periods of low demand (off-peak period) or of excess supply from intermittent renewable generators is used to liquefy air. This is then stored as a cryogen in a storage tank, and subsequently released, pumped and heated to drive a turbine and produce electricity during the discharge or power recovery phase (during the peak period where the electricity costs are high). Cryogenic energy storage technology relies on the thermodynamic energy potential between liquid air at cryogenic temperatures and gaseous air at ambient temperature and above. The acronym CES stands for Cryogenic Energy Storage, and is used thus throughout the whole specification. The round trip efficiency of a CES system is defined as being the ratio of the net electrical energy output of the power recovery unit to the net electrical energy input of the liquefaction unit.

In a simplified view depicted in FIG. 2, CES systems are made of a liquefaction unit (1), a cryogen tank (2) and a power recovery unit (3). They can be classified into two categories:

standalone CES systems that are self-sufficient in terms of thermal energy, i.e. they do not require integration with an external source of hot thermal energy and an external source of cold thermal energy;

and thermally integrated CES systems, i.e. CES systems receiving waste hot thermal energy and/or waste cold thermal energy from systems external to and co-located with said CES systems, such as nuclear power plants, thermal power plants (e.g. open cycle gas turbine gas plants; combined cycle gas turbine plants and conventional steam cycles), data centres, steel works, furnaces used by ceramics, terra cotta, glass-making and cement-making industries for waste hot thermal energy; and for example LNG regasification terminals for waste cold energy.

Thermal energy could be either cold or hot.

The term 'waste cold thermal energy' encompasses any cold thermal energy that is a by-product of a first system and is used in a system other than the first system. Likewise, the term 'waste hot thermal energy' encompasses any hot thermal energy that is a by-product of a first system and is used in a system other than the first system.

The term 'heat of compression' refers to hot thermal energy embedded in a fluid that has been compressed. In other words, 'heat of compression' refers to the increase in sensible energy experienced by the process stream of the liquefaction unit as a result of compression. Accordingly, this term could also encompass any hot thermal energy that was generated during the compression of a fluid, later on stored in a thermal energy storage device and subsequently supplied to another fluid. The heat of compression referred in this patent application does not qualify as waste hot thermal energy as it is produced and used by the same system in which it is generated, namely a CES system.

The present invention addresses the practical implementation of a heat-of-compression recycle system within both standalone and thermally integrated CES systems such that heats of compression of different grades and amounts, released and captured during the liquefaction phase, are subsequently utilised to improve the power output provided by the power recovery unit during the power recovery phase. In addition, increasing the temperature of a working fluid prior to its expansion either via pre-stage heating or inter-stage reheating, using the stored heat of compression, results in an increase in the power output of the power recovery unit, which leads to an improvement of the round trip efficiency of the CES system.

Above ambient temperature, the grade of hot thermal energy increases with increasing temperature. Conversely, below ambient temperature, the grade of cold thermal energy increases with decreasing temperature.

The present invention aims at applying stored heats of compression to configurations of turbo-expander expansion stages to improve the efficiency of the power recovery sub-system. It also aims at providing a heat-of-compression recycle system able to improve the round trip efficiency of a CES system into which it is integrated, and a method for recycling heats of compression harnessed during the liquefaction phase and recovered during the power recovery phase in order to improve the round-trip efficiency of CES systems.

The heat of compression generated during compression is characterised not only by its grade but also by its quantity. The grade and the quantity of hot thermal energy embedded in a given fluid processed by a compressor can be said to be a function of the mass flow rate processed by the compressor, the compressor inlet temperature, the compressor inlet pressure, the overall compressor pressure ratio and the efficiency of the compressor.

CES systems may use sub-systems which are designed to capture the heat of compression generated in the liquefaction unit during the liquefaction phase, i.e. the hot thermal energy embedded in the pressurised stream of gas to be liquefied, then to store it in a thermal energy storage device (TESD), and to release it to the working fluid of the power recovery unit during the power recovery phase. The capture and release of hot thermal energy may rely on the use of at least one heat exchanger. Such sub-systems are referred to throughout this specification as heat-of-compression recycle systems.

The pressurised stream of gas to be liquefied present in the liquefaction unit and the pressurised cryogen present in the power recovery unit are typically designated a 'process stream of the liquefaction unit' and a 'working fluid of the power recovery unit', respectively.

Known heat-of-compression recycle systems typically comprise at least one compressor, at least one turbo-expander and at least one thermal energy storage device.

A compressor suitable for use in heat-of-compression recycle systems including those of the present invention may be characterised by the inlet and outlet pressures of the fluid processed by the compressor. A compressor may be axial, centrifugal, reciprocating or rotary or of any combination thereof etc. A compressor may exhibit at least one compression stage, each compression stage being defined by its pressure ratio. The number of compression stages and their respective pressure ratios are typically determined by the turbomachinery performance optimisation undertaken through computer simulation by the thermodynamic process engineers, assuming given operating conditions (e.g. desired temperature at each compression stage output, minimisation of the pressure drop in between compression stages taking into consideration the inter stage-located pieces of equipment, the manufacturer equipment specifications, etc.). Typically, coolers (i.e. heat exchangers using air or water to cool the process stream) are placed either upstream of the compression stages of a compressor to cool the process stream prior to its compression through them or downstream of the compressor output to cool down the process stream and ease its subsequent liquefaction. In the first configuration, the power input to drive the downstream compression stage is reduced by decreasing its compression stage input temperature. The second configuration allows for removing further hot thermal energy from the stream of gas output by the compressor and thus eases its subsequent liquefaction. Consequently, coolers may remove part or all of the heat of compression embedded in the process stream of the liquefaction. The present heat-of-compression recycle system allows for capturing heat of compression downstream of any compression stage and downstream of any combination of compression stages via at least one heat-of-compression capturing heat exchanger.

A turbo-expander suitable for use in heat-of-compression recycle systems including those of the present invention may be characterised by the inlet and outlet pressures of the fluid processed by the turbo-expander. A turbo-expander may be axial or radial or of any combination thereof. A turbo-expander may exhibit at least one expansion stage; each expansion stage is defined by its pressure ratio. The number of expansion stages and their respective pressure ratios are typically determined by the turbomachinery performance optimisation undertaken through computer simulation by the thermodynamic process engineers, assuming given operating conditions (e.g. amount of hot thermal energy and temperature to achieve at each expansion stage output, minimisation of the pressure drop in between expansion stages taking into consideration the inter stage-located pieces of equipment, the manufacturer equipment specifications, etc.).

Typically, power recovery heaters (i.e. heat exchangers) are placed either immediately upstream of the turbo-expander input or between its expansion stages to heat the stream of gas prior to expansion, as the process of expansion involves a decrease of the fluid temperature. Both configurations allow for increasing the power output of the turbo-expander.

The aim of a thermal energy storage device (TESD) is to capture, store and release thermal energy (i.e. hot or cold thermal energy) in a controlled manner. There are different types of TESDs which typically differ in their internal architecture. Some TESDs, commonly known as 'packed beds' are filled with a stationary solid phase through which a thermal energy transfer fluid circulates either to charge the TESD with thermal energy or to discharge it so as to supply it where it is needed. The stationary solid phase could be made of a porous solid medium or a packed bed of solid particles able to retain thermal energy. More elaborate packed bed TESDs disclosed in WO2012020233A2 aim at providing a flexible system able to accommodate for asymmetric charge and discharge while keeping the pressure drop at an acceptable level and minimising the end effects by increasing the flow rate of the thermal energy transfer fluid towards the end of the charge and discharge of the TESDs. Other TESDs are filled with a stationary liquid phase through which at least one heat exchange coil passes allowing for the passage of a thermal energy transfer fluid. Other TESDs, commonly known as thermoclines, are made of a vessel containing two density-dependent regions of a single thermal energy transfer fluid at different temperatures, stacked on each other (due to density difference). One version of a thermocline comprises two separate vessels, each accommodating the same thermal energy transfer fluid at two different temperatures (i.e. there is a warm tank and a cold tank).

Known heat-of-compression recycle systems may capture and store (in a TESD) the heat of compression embedded in the process fluid of the liquefaction unit after compression through a compressor, and transfer it to the working fluid of the power recovery unit prior to its expansion through a turbo-expander.

The type of TESDs conventionally employed in a heat-of-compression recycle system determines the type of heat exchange occurring between the process stream of the liquefaction unit and the thermal storage medium of the TESD, and between the thermal storage medium of the TESD and the working fluid of the power recovery unit. Table 1 summarises the mechanisms of thermal energy transfer for different types of TESD. (The symbols "+" and "−" mentioned in Table 1 mean that a given heat exchange type is either possible or not, respectively). Heat exchange between the process fluid of the liquefaction unit or the working fluid of the power recovery unit, and the thermal storage medium of a TESD are indeed either of direct or indirect nature. Direct heat exchange between a fluid (e.g. the process fluid of the liquefaction unit or the working fluid of the power recovery unit) and the thermal storage medium of a TESD, relies on direct physical contact between them. Indirect heat exchange between a fluid (e.g. the process fluid of the liquefaction unit or the working fluid of the power recovery unit) and the thermal storage medium of a TESD, implies the use of an intermediate heat exchanger enabling the heat transfer between said fluid and the intermediate heat transfer fluid circulating through the TESD.

TABLE 1

|  | Direct heat exchange | Indirect heat exchange |
| --- | --- | --- |
| Packed beds | + | + |
| Stationary liquid phase-based TESDs | − | + |
| Thermoclines | − | + |
| Two-reservoirs TESDs | − | + |

FIG. 3A-3D depict schematic diagrams of ways in which heat transfer from a compressor to a turbo-expander might take place. Each schematic comprises a compressor, a packed-bed TESD and a turbo-expander. The heat of compression generated by the compressor during the liquefaction phase is captured via a heat-of-compression capturing heat exchanger and stored in the TESD. The stored heat of compression is subsequently applied to the working fluid of the power recovery unit during the power recovery phase. The liquefaction phase and the power recovery phase may occur at different times. Consequently, the arrows indicating the direction of the streams flowing in the heat-of-compression recycle system are just for information and do not express the fact that the liquefaction phase and the power recovery phase occur at the same time. However, in some cases the liquefaction phase and the power recovery phase may occur simultaneously.

Table 2 summarises the information related to the nature of the heat exchange occurring in FIG. 3A-3D.

TABLE 2

| Drawings | Nature of heat exchange between the process fluid of the liquefaction unit and the thermal storage medium of a packed-bed TESD | Nature of heat exchange between the thermal storage medium of a packed-bed TESD and the working fluid of the power recovery |
| --- | --- | --- |
| FIG. 3A | Direct | Direct |
| FIG. 3B | Indirect | Indirect |
| FIG. 3C | Direct | Indirect |
| FIG. 3D | Indirect | Direct |

In FIG. 3A, the heat of compression is captured and released by the TESD (4) via direct heat exchange such that the TESD (4) is in fluid connection with and downstream of the compressor (5), and in fluid connection with and upstream of the turbo-expander (6). After compression through the compressor (5), the process stream of the liquefaction unit is conveyed through the packed bed of the TESD (4) to transfer its hot thermal energy to it. The working fluid of the power recovery unit is later on circulated through the packed bed of the TESD (4) to collect the heat of compression stored in the TESD (4) prior to its expansion through the turbo-expander (6). The compressor (5) output pressure imposes the TESD pressure, which in turn imposes the turbo-expander (6) input pressure. However, it is possible to pressure-cycle the TESD, to the detriment of the capital expenditure of the whole system, if the pressure at which the heat of compression is captured and stored is different to the pressure at which the stored heat of compression is supplied to the working fluid of the power recovery unit.

In FIG. 3B, the heat of compression is captured and released by the TESD (4) via indirect heat exchange such that the pair of the TESD (4) and the heat-of-compression capturing heat exchanger (7) and the pair of the TESD (4) and heat exchanger (8) are enclosed in a first closed loop and a second closed loop, respectively, sharing part of the arrangement of conduits and the TESD (4), through both of which a heat transfer fluid circulates. A circulation pump allows for circulating the heat transfer fluid through both closed loops. The heat-of-compression capturing heat exchanger (7) seeks to retrieve as much heat of compression as possible from the compressed fluid (i.e. the process fluid of the liquefaction unit) and accordingly does not qualify as a cooler (defined hereinbefore) whose function is to dump at least some of the heat of compression embedded in the process fluid of the liquefaction unit. The heat exchanger (8) qualifies as a power recovery heater (defined hereinbefore). The heat of compression is transferred from the process stream of the liquefaction unit after compression via the compressor (5) to the working fluid of the power recovery unit prior to expansion via the turbo-expander (6), via the successive actions of the heat transfer fluid circulating through the first closed loop and the packed bed of the TESD (4) and the heat transfer fluid circulating through the packed bed of the TESD (4) and the second closed loop. This configuration presents the advantage that the pressure within the first and second closed loops is completely independent of that of the process fluid of the liquefaction unit and that of the working fluid of the power recovery unit.

FIG. 3C-3D represent the cases where the heat-of-compression capture and release by the TESD (4) occur each via a heat exchange of nature different from one another.

In FIG. 3C, the TESD (4) is in fluid connection with and downstream of the compressor (5). The TESD (4) and the power recovery heater (8) are enclosed in a third separate closed loop, through which a heat transfer fluid circulates. The heat of compression embedded in the process stream of the liquefaction unit after compression through the compressor (5) is directly transferred to the packed bed of the TESD (4). Then, the heat transfer fluid of the third closed loop conveys the heat of compression stored in the TESD (4) via power recovery heater (8) to the working fluid of the power recovery unit prior to expansion through the turbo-expander (6). Pressure cycling the TESD (4) may be necessary if the pressure of the compressor (5) output is different to that of the heat transfer fluid circulating in the third separate closed loop.

In FIG. 3D, the TESD (4) and the heat-of-compression capturing heat exchanger (7) are enclosed in a fourth separate closed loop, through which a heat transfer fluid circulates. The TESD (4) is in fluid connection with and upstream of the turbo-expander (6). The heat of compression embedded in the process stream of the liquefaction unit after compression through the compressor (5) is transferred first to the heat transfer fluid of the fourth closed loop via the heat-of-compression capturing heat exchanger (7) and then to the packed bed of the TESD (4). Prior to its expansion through the turbo-expander (6), the working fluid of the power recovery unit strips the stored heat of compression from the TESD (4) by circulating through it. Pressure cycling the TESD (4) may be necessary if the pressure of the turbo-expander (6) input is different to that of the heat transfer fluid circulating through the fourth separate closed loop.

There are several technical factors to consider when it comes to selecting the most energy-efficient heat-of-compression recycle system configurations out of the four mentioned in Table 2, namely: the heat transfer efficiency, the pumping energy requirements and the pressure drop. Direct heat exchange does not involve the use of intermediate heat transfer fluid and thus promotes higher heat-transfer efficiency than indirect heat exchange. In terms of pumping energy requirements, the density of a heat transfer fluid is of prime importance: for a given pressure difference, the higher the density of a fluid, the lower the work input said fluid requires to be compressed. Selecting the most energy-efficient heat-of-compression recycle system configurations may be done by running computer-based simulations.

With respect to direct heat exchange occurring during the liquefaction phase, a single TESD cannot simultaneously capture the heat of compression generated by each compression stage of a compressor as the output pressures of the various compression stages of a compressor are different to one another. A single TESD may be placed downstream of any compression stage of the compressor and should thus be able to withstand the output pressure of the compression stage upstream of said TESD. This technical requirement has a large impact on capital expenditure since the higher the pressure, the larger the amount of steel needed for the TESD pressure vessel to support it and the greater the TESD cost.

With respect to direct heat exchange occurring during the power recovery phase, a single TESD cannot simultaneously supply the stored heat of compression to each expansion stage of a turbo-expander as the input pressures of the various expansion stages of the turbo-expander are different to one another.

With respect to indirect heat exchange occurring during the liquefaction phase, a single TESD could capture the heat of compression generated by each compression stage simultaneously by placing a heat-of-compression capturing heat exchanger downstream of each compression stage of the compressor. It is important to keep in mind that the heats of compression generated by a plurality of compression stages generally exhibit different temperatures.

With respect to indirect heat exchange occurring during the power recovery phase, a single TESD could supply the stored heat of compression prior to each expansion stage simultaneously by placing a power recovery heater upstream of a turbo-expander and in between each expansion stage of the turbo-expander.

The heat-of-compression capture by a TESD via direct heat exchange implies to store heat of compression at the compressor output pressure, which affects the cost of the TESD pressure vessel. And the heat of compression released by a TESD via direct heat exchange involves either that the TESD pressure be the same as that of the turbo-expander input, which affects the cost of the turbo expander in as much as the pressure is high (the turbo-expander must be made of materials able to withstand high pressure, which increases its costs); or to pressure-cycle the TESD, resulting in higher capital expenditure.

The current inventors have noticed that having the TESD interacting with compressors and turbo-expanders via indirect heat exchange presents a number of advantages compared to the case where it is done via direct heat exchange: it allows not only for tuning the TESD pressure to balance hot thermal energy transfer efficiency and capital expenditure, but also for capturing (via heat-of-compression capturing heat exchangers placed downstream of any compressors or compression stages) and storing heat of compression and later supplying it via power recovery heaters prior to any expansion stages of a turbo-expander or any turbo-expanders.

Recycling the heat of compression generated by the liquefaction unit for increasing the power output of the power recovery unit has been mentioned in several patent applications (e.g. WO2007096656A1). Other patent applications exhibit some embodiments to implement the concept of heat-of-compression recycle.

US20150218968A1 proposes a simple arrangement wherein the liquefaction unit and the power recovery unit comprise four compressors (items 101, 105, 109 and 113) and four turbo-expanders (602, 603, 604, 605) respectively. Each given pair of compressor/turbo-expander is associated with a given TESD integrated with coolers, as shown in FIGS. 6-8 of that application. The first TESD is associated with first compressor/fourth turbo-expander, the second TESD with a second compressor/third turbo-expander, the third TESD with a third compressor/second turbo-expander and the fourth TESD with a fourth compressor/first turbo-expander. However, US20150218968A1 does not disclose any details about the nature of the heat exchange from the compressors to the TESD and from the TESD to the turbo-expanders, the pressure ratio of the compressors, the mass flow rate processed by the compressors, the temperature and the quantity of heat of compression obtained and the best way to distribute it to the expansion stages to optimise the power output of the power recovery unit.

WO2015154862A1 displays an arrangement wherein the liquefaction unit comprises two compressors: a first compressor that is adiabatically operable in a pressure range between 10 and 60 bar; and a second quasi-isothermal operable compressor for pressures beyond 60 bar. Heat of compression is only retrieved from the first compressor, as the second compressor requires coolers to function effectively. Downstream of the first compressor, two TESDs are placed in parallel: both TESDs are either packed-bed TESDs working by direct heat exchange (FIG. 4) or indirect heat exchange (FIG. 5) or two-reservoir TESDs (FIG. 6). Each TESD is assigned to a given turbo-expander. Having these two TESDs in parallel allows for controlling the pressurised stream mass flow rate of each branch in accordance with the available room in each TESD for storing hot thermal energy. Nevertheless, the hot thermal energy supplied by these two TESDs is of the same grade, as it stems from a single compressor.

FIG. 14 of WO2013034908A2 exhibits a CES system wherein the heat-of-compression recycle system is made up of two separate closed loops sharing a single TESD. The first closed loop indirectly receives the heats of compression generated by two compressors, the main air compressor and the recycle air compressor, and stores this hot thermal energy in a single TESD. The recycle air compressor is located downstream of the main air compressor and an air purification unit. The recycle air compressor input pressure is equal to or greater than the main air compressor output pressure and the mass flow rate of the process stream of the liquefaction unit processed by the recycle air compressor is equal or greater than that processed by the main air compressor, as the gaseous output stream of the phase separator merges with the main air compressor output before being processed by the recycle air compressor. Consequently, two different amounts of heat of compression of distinct grades are generated by the main air compressor and the recycle air compressor and are stored in a single TESD. Although it is not disclosed in WO2013034908A2, there are three ways to deal with two heats-of-compression of different amounts and grades that are meant to be stored in a single TESD:
- they may be mixed in the conduits of the first closed loop;
- the temperature of one heat of compression may be adjusted to that of the other heat of compression by employing at least one cooler;
- the temperature of both heats of compression can be adjusted to reach the same target temperature by using at least one cooler for each compressor.

All of these three ways result in an undesirable loss of hot thermal energy grade.

The second closed loop in WO2013034908A2 indirectly transfers the stored heat of compression to two expansion stages of a turbo-expander via power recovery heaters. There is no flexibility in terms of providing the stored heat of compression, as the first expansion stage receives a higher grade of heat of compression than the second expansion stage, since the power recovery heaters providing hot thermal energy to the first and second expansion stages are in series. Furthermore, this configuration does not offer the possibility to tune the amount of heat experienced by each expansion stage and to have both expansion stages feel the same temperature.

The heat-of-compression recycle system of WO2015138817A1 is designed to retrieve and store the heat of compression of different grades (350-580° C. with respect to the first compressor and 240-260° C. with respect to the second compressor) from two liquefaction compressors by employing two TESDs, each TESD being in direct or indirect heat exchange with a given compressor. Each TESD encompasses a given cooler and a given water-cooled balance heat exchanger (Balance HEX) in order to decrease the temperature further after partial hot thermal energy capture by each TESD. The first set of cooler/Balance HEX, located downstream of the first compressor, reduces the mechanical work input required by the second compressor. The second set of cooler/Balance HEX, located downstream of the second compressor, assists the liquefaction occurring later on. The first cooler and the first Balance HEX maintain the temperature between 4° and 60° C., and around 30° C., respectively. The second cooler and the second Balance HEX maintain the temperature between 4° and 120° C., and around 30° C., respectively. WO2015138817A1 does not allow for the amount of heat of compression that can be harnessed from the two compressors to be optimised. According to FIG. 1B of WO2015138817A1, the first TESD is associated with first compressor/first turbo-expander and the second TESD with second compressor/second turbo-expander. WO2015138817A1 does not disclose any further relationships between TESDs and compressor/turbo-expander pairs, and it does not suggest any way to optimise the round trip efficiency of a CES system by modifying in some way a heat-of-compression recycle system. Furthermore, no information is disclosed regarding the nature of the heat exchange between the TESD and the expansion stages.

The present inventors have thus made improvements to known heat-of-compression recycle systems, and sub-systems thereof, which address some or all of the problems mentioned above, taking advantage of the presence of two compressors, i.e. a main air compressor and a recycle air compressor, within a CES system to store heats of compression of different grades and amounts during the liquefaction phase in given TESDs and release them via power recovery heaters upstream of the expansion stages of the turbo-expander of the power recovery unit to improve its power output during the power recovery phase, and hence the round-trip efficiency of the whole system.

SUMMARY OF THE INVENTION

In a first aspect, the present invention provides a power recovery sub-system for a cryogenic energy storage system, the power recovery sub-system comprising:
- a first heat source;
- a first heat exchanger;
- a second heat exchanger;
- a first expansion stage;
- a second expansion stage;
- a first arrangement of conduits, having an upstream end and a downstream end, and configured to pass a working fluid through the first heat exchanger, the first expansion stage, the second heat exchanger, and the second expansion stage; and
- a second arrangement of conduits configured to pass a first heat transfer fluid from the first heat source, through the first heat exchanger and the second heat exchanger,
- wherein the second arrangement of conduits is further configured to pass a first portion of the first heat transfer fluid through the first heat exchanger and pass a second portion of the first heat transfer fluid through the second heat exchanger.

The power recovery sub-systems may, for example, employ a single heat source, such as a thermal energy storage device, to provide pre-stage heating at the same temperature, or grade, to multiple expansion stages. Such power recovery sub-systems may comprise conduits and valves configured to split a heat transfer fluid flowing from the heat source (e.g. flowing through the thermal energy storage device) into a plurality of portions, each of which may pass through a single heat exchanger associated with an expansion stage. These portions of fluid have a mass flow rate less than that of the combined flow, but have the same temperature. In other words, they are of the same hot thermal energy grade. The portions may be passed through separate heat exchangers associated with corresponding expansion stages in order to apply pre-stage heating at the same temperature to multiple expansion stages.

The amount of hot thermal energy provided during pre-stage heating is mainly determined by the temperature of the portion of first heat transfer fluid and the mass flow rate of said first heat transfer fluid.

It is advantageous to be able to adjust the amount of hot thermal energy provided during pre-stage heating to maximise the work output of the expansion stages for a given grade of hot thermal energy delivered by a thermal energy storage device. This can be achieved by further heating or cooling the first heat transfer fluid, however, this either requires more energy input or wastes stored heat of compression by removing it via cooling. The first aspect of the invention provides an efficient way to achieve hot thermal energy adjustment between expansion stages through the arrangements of conduits.

One way to achieve arrangements of conduits according to the first aspect of the invention is to use valves to adjust the mass flow rate of the fluid from the thermal energy storage device. Valves introduce very little loss to pressure drop and very little loss to temperature of the fluid, while allowing the amount of hot thermal energy provided by pre-stage heating to each expansion stage to be controlled via the portion flow rate. (The temperature of each portion of a heat transfer fluid circulating through the power-recovery sub-system is the same as that of said heat transfer fluid.)

By controlling the amounts of hot thermal energy provided by pre-stage heating to each expansion stage, the efficiency of the power recovery sub-system is maximised. In other words, the combined work output from the expansion stages is maximised by providing certain amounts of pre-stage heating to each expansion stage, thus control of the said pre-stage heating amounts is advantageous because it increases the efficiency of the power recovery sub-system.

Increasing the efficiency of the power recovery sub-system increases the efficiency of the cryogenic energy storage system of which it is a part. In other words, controlling the amounts of heating provided by pre-stage heating to each expansion stage is advantageous because it increases the efficiency of the cryogenic energy storage system.

The sub-system may further comprise
a third heat exchanger; and
a third expansion stage;
wherein the first arrangement of conduits is further configured to pass the working fluid through the third heat exchanger and the third expansion stage; and
wherein the second arrangement of conduits is further configured to pass a third portion of the first heat transfer fluid through the third heat exchanger.

The first heat transfer fluid may be split, by further configuring the second arrangement of conduits into three portions, with each portion providing pre-stage heating to an associated expansion stage. This provides further control over the amount of hot thermal energy provided by pre-stage heating to each expansion stage.

Again, one way to achieve the further configuration of the second arrangement of conduits is to use valves to adjust the mass flow rate of the fluid from the thermal energy storage device. Using valves in this way provides the advantages discussed above.

The sub-system may further comprise
a second heat source;
a fourth heat exchanger;
a fourth expansion stage; and
a third arrangement of conduits configured to pass a second heat transfer fluid from the second heat source, through the fourth heat exchanger,
wherein the first arrangement of conduits is further configured to pass the working fluid through the fourth heat exchanger and the fourth expansion stage.

A second heat source (e.g. second thermal energy storage device) may provide pre-stage heating to at least one expansion stage which is not receiving hot thermal energy from the first heat source (e.g. first thermal energy storage device). This provides further control of the amount of hot thermal energy provided by pre-stage heating to each expansion stage because it allows for different temperatures of fluid to be used for different subsets of expansion stages. In other words, utilising two sources of heat provides further control of the amounts of hot thermal energy being provided by pre-stage heating to each expansion stage.

The sub-system may further comprise
a fifth heat exchanger; and
a fifth expansion stage;
wherein the first arrangement of conduits is further configured to pass the working fluid through the fifth heat exchanger and the fifth expansion stage; and
wherein the third arrangement of conduits is further configured to pass a first portion of the second heat transfer fluid through the fourth heat exchanger and pass a second portion of the second heat transfer fluid through the fifth heat exchanger.

The first and second heat sources (e.g. thermal energy storage devices) may provide pre-stage heating to five expansion stages. When there are five expansion stages, preferably pre-stage heating is to be provided for three of the five expansion stages by the first thermal energy storage device and pre-stage heating may be provided for the remaining two of the five expansion stages by the second thermal energy storage device. This provides further control of the amount of hot thermal energy provided by pre-stage heating to each expansion stage.

The sub-system may be configured such that the or each heat exchanger through which the third arrangement of conduits passes is positioned along the first arrangement of conduits upstream of the heat exchangers through which the second arrangement of conduits passes.

Alternatively, the or each heat exchanger through which the third arrangement of conduits passes is positioned along the first arrangement of conduits downstream of the heat exchangers through which the second arrangement of conduits passes.

In other words, where there are first and second subsets of heat exchangers being treated by heat from first and second sources of heat respectively, such as thermal energy storage devices, they may be arranged along the first arrangement of conduits such that the first subset is upstream of the second or vice versa.

As expressed elsewhere herein, heat exchangers may be used to transfer heat from the first heat transfer fluid to the working fluid of the power recovery unit. The working fluid of the power recovery unit may be called the working fluid. Such heat exchangers may be placed immediately upstream of the expansion stage which they are heating. The first heat transfer fluid and the working fluid flow through the heat exchanger. Preferably, the heat exchangers are counter flow heat exchangers, wherein the first heat transfer fluid and the working fluid flow in opposite directions through the heat exchanger.

The heat exchangers transferring hot thermal energy from the second thermal energy storage device may be upstream, where upstream here refers to the stream direction of the working fluid of the power recovery unit, of the heat exchangers transferring hot thermal energy from the first thermal energy storage device.

Alternatively, the heat exchangers transferring hot thermal energy from the first thermal energy storage device may be upstream, where upstream here refers to the stream direction of the working fluid of the power recovery unit, of the heat exchangers transferring hot thermal energy from the second thermal energy storage device.

These arrangements of heat exchangers allow for greater control of the hot thermal energy transferred by pre-stage heating to the expansion stages. The optimal heat transfer to each expansion stage can be implemented by using said control, which in turn increases the power output of the power recovery unit, which in turn provides improved efficiency of the cryogenic energy storage system.

The sub-system may further comprise
a sixth heat exchanger,
wherein the first arrangement of conduits is further configured to pass the working fluid through the sixth heat exchanger upstream of both (i) the furthest upstream heat exchanger through which the second arrangement of conduits passes and (ii) the furthest upstream heat exchanger through which the third arrangement of conduits passes, and
wherein the first arrangement of conduits is further configured to pass the working fluid output from the furthest downstream expansion stage through the sixth heat exchanger to an exhaust.

An additional power recovery heater may be used to heat the working fluid of the power recovery unit before it passes through any heat exchanger providing hot thermal energy from the first or second thermal energy storage devices. This provides an advantage since the output stream of the furthest downstream expansion stage may be at a higher temperature than the input stream to the furthest upstream heat exchanger providing hot thermal energy from the first or second thermal energy storage devices. The otherwise wasted hot thermal energy in said output stream of the downstream expansion stage can be transferred through the additional power recovery heater to the power recovery unit to increase the efficiency of the cryogenic energy storage system.

The sub-system may further comprise a fourth arrangement of conduits configured to divert a portion of the working fluid from a downstream position in the first arrangement of conduits through an evaporator and a first compressor, and return it to an upstream position in the first arrangement of conduits.

The sub-system may be configured such that the evaporator is positioned along the first arrangement of conduits upstream of the furthest upstream heat exchanger, wherein the downstream position is downstream of the furthest downstream expansion stage; and wherein the upstream position is immediately upstream of the furthest downstream expansion stage.

A portion of the working fluid of the power recovery may be taken from a position downstream of the furthest downstream expansion stage. This portion may be passed through an evaporator and a compressor before being returned to the working fluid of the power recovery unit immediately upstream of the furthest downstream expansion stage. Not only does this portion heat the working fluid of the power recovery unit in the evaporator (i.e. this portion is cooled prior to compression) before it reaches the compressor, but the compressed portion re-joining the working fluid of the power recovery unit increases the mass flow rate of the working fluid of the power recovery unit through the furthest downstream expansion stage. Both of these effects increase the expansion work output of the power recovery unit, increasing the power output of the power recovery unit, its efficiency, and the efficiency of the cryogenic energy storage system.

The sub-system may be configured such that the second arrangement of conduits passes through the first, second and third heat exchangers and preferably no other heat exchanger and the third arrangement of conduits passes through the fourth heat exchanger and preferably no other heat exchanger, and wherein the heat exchanger through which the third arrangement of conduits passes is upstream of the heat exchangers through which the second arrangement of conduits passes.

The sub-system may be configured such that the second arrangement of conduits passes through the first, second, and third heat exchangers and preferably no other heat exchanger and the third arrangement of conduits passes through the fourth and fifth heat exchangers and preferably no other heat exchanger, wherein the heat exchangers through which the second arrangement of conduits passes are upstream of the heat exchangers through which the third arrangement of conduits passes.

The sub-system may be configured such that the second arrangement of conduits passes through the first, second and third heat exchangers and preferably no other heat exchanger and the third arrangement of conduits passes through the fourth heat exchanger and preferably no other heat exchanger, wherein the heat exchangers through which the second arrangement of conduits passes are upstream of the heat exchanger through which the third arrangement of conduits passes.

These arrangements of heat exchangers allow for greater control of the hot thermal energy transferred by pre-stage heating to the expansion stages. The optimal heat transfer to each expansion stage can be implemented by using said control, which in turn provides improved efficiency of the power recovery unit, which in turn provides improved efficiency of the cryogenic energy storage system. The specific arrangements specified above were found to be particularly effective.

The first heat source in the sub-system may be a first thermal energy storage device and the second arrangement of conduits may be further configured to return the first heat transfer fluid to the first thermal energy storage device after passing it through each heat exchanger through which the second arrangement of conduits is configured to pass, such that the second arrangement of conduits forms a first closed circuit.

Moreover, the second heat source may be a second thermal energy storage device and the third arrangement of conduits may be further configured to return the second heat transfer fluid to the second thermal energy storage device after passing it through each heat exchanger through which the second arrangement of conduits is configured to pass, such that the third arrangement of conduits forms a second closed circuit.

The first thermal energy storage device may be configured to store at least a portion of a heat of compression generated by a recycle air compressor and the second thermal energy storage device may be configured to store at least a portion of a heat of compression generated by a main air compressor, and the second thermal energy storage device may comprise pipework suitable for transporting molten salts.

These configurations of thermal energy storage devices are advantageous because they allow the different grades of heat generated by the recycle air compressor and the main air compressor to be stored separately and efficiently. By storing the grades of heat separately, they can be applied separately, to different parts of the process stream. Applying different grades of heat at different positions in the power recovery system has been found to provide particularly efficient power recovery.

The sub-system may further comprise
a tenth heat exchanger; and
an eleventh heat exchanger, wherein:
the second heat source may be a second thermal energy storage device, the first arrangement of conduits may be further configured to pass the working fluid through the tenth heat exchanger immediately upstream of the fourth heat exchanger, and wherein;
the third arrangement of conduits may be configured to form two closed loops, the first closed loop passing through the second thermal energy storage device and the eleventh heat exchanger, and the second closed loop passing through the eleventh heat exchanger and the fourth heat exchanger,
optionally wherein a heat transfer fluid in the first closed loop may comprise molten salts, further optionally wherein a heat transfer fluid in the second closed loop may comprise a thermal oil or a mixture of thermal oils.

The first thermal energy storage device may be configured to store at least a portion of the heat of compression generated by a main air compressor and at least a portion of the heat of compression generated by a recycle air compressor, and the second thermal energy storage device may be configured to store and at least a portion of the heat of compression generated by the main air compressor, and the second thermal energy storage device may comprise pipework suitable for transporting molten salts.

It can be advantageous to store portions of the heat of compression from the main air compressor in both the first and second thermal energy storage device. In particular, the inventors have found it advantageous to store relatively high grade heat from the main air compressor in the second thermal energy storage device and relatively lower grade heat from the main air compressor in the first thermal energy storage device. Storing different grades of heat separately from one another has numerous advantages, including efficient storage and efficient power recovery when applying the stored heat to the process stream.

The second thermal energy storage device may be configured to store thermal energy at a higher temperature than the temperature of the thermal energy stored in the first thermal energy storage device, and the second thermal energy storage device may be configured to store thermal energy between 150° C. and 550° C., preferably between 200° C. and 400° C., and the first thermal energy storage device may be configured to store thermal energy between 150° C. and 350° C.

Configuring the thermal energy storage devices to store the temperatures specified above has been found to be particularly effective and leads to more efficient power recovery.

In a second aspect, the present invention provides a cryogenic energy storage system, comprising:
a power recovery sub-system comprising a plurality of expansion stages configured to receive, via a corresponding plurality of heat exchangers, hot thermal energy from a first thermal energy storage device and a second thermal energy storage device and transfer it to a working fluid passing through the plurality of expansion stages and plurality of heat exchangers; and
a liquefaction sub-system configured to supply hot thermal energy to the first and second thermal energy storage devices, and further comprising;
a main air compressor;
a recycle air compressor;
an eighth heat exchanger;
a ninth heat exchanger;
a fifth arrangement of conduits configured to pass a process stream through the main air compressor, eighth heat exchanger, recycle air compressor, and ninth heat exchanger;
a sixth arrangement of conduits forming a third closed circuit and configured to pass a third heat transfer fluid between the second thermal energy storage device and the eighth heat exchanger; and
a seventh arrangement of conduits forming a fourth closed circuit and configured to pass a fourth heat transfer fluid between the first thermal storage device and the ninth heat exchanger,
wherein the eighth heat exchanger is positioned along the fifth arrangement of conduits immediately downstream of the main air compressor and configured to transfer at least a portion of the heat of compression of the process stream from the main air compressor, via the third heat transfer fluid to the second thermal energy storage device, and
wherein the ninth heat exchanger is positioned along the fifth arrangement of conduits immediately downstream of the recycle air compressor and configured to transfer at least a portion of the heat of compression of the process stream from the recycle air compressor, via the fourth heat transfer fluid to the first thermal energy storage device.

Preferably the power recovery sub-system is as described above.

This aspect of the invention may be applied in CES systems which comprise at least a power recovery unit and a liquefaction unit, and may be applied not only to stand-alone CES systems, but also to thermally integrated CES systems, preferably (i) those receiving only waste cold thermal energy, (ii) those receiving waste cold thermal energy and whose waste hot thermal energy needs are partially met by systems external to and co-located with said CES systems and (iii) those receiving no waste cold thermal energy and whose waste hot thermal energy needs are partially met by systems external to and co-located with said CES systems. This invention may also be employed in any technical fields where a gas is to be liquefied, then stored and subsequently re-gasified on the same site.

CES systems according to the present invention take advantage of the presence of two compressors (i.e. a main air compressor and a recycle air compressor) within a CES system to store heat of compression of different grades and amounts during the liquefaction phase in given TESDs and release them via power recovery heaters upstream of the expansion stages of the turbo-expander of the power recovery unit to improve its mechanical work output during the power recovery phase and hence the round-trip efficiency of the whole system.

A liquefaction unit can provide heat of compression, which can be stored in thermal energy storage devices and applied to the power recovery unit. Recycling this heat of compression improves the efficiency of the cryogenic energy storage system. In particular, the main air compressor and the recycle air compressor of a liquefaction sub-system each output heat of compression.

The cryogenic energy storage system may further comprise:
- a cold box;
- a liquefaction turbo-expander;
- an eighth arrangement of conduits, configured to pass at least a portion of the process stream through part of the cold box then through the liquefaction turbo-expander before going back through the cold box and merging with the fifth arrangement of conduits upstream of the recycle air compressor, such that the mass flow rate of the fluid through the main air compressor is less than the mass flow rate of fluid through the recycle air compressor;
- a ninth arrangement of conduits, configured to pass at least a portion of the process stream through the cold box, an expansion device, preferably a Joule-Thomson valve or wet turbo-expander, to a phase separator, such that the portion of the process stream in the eighth arrangement of conduits transfers cold thermal energy to the portion of the process stream in the ninth arrangement of conduits via the cold box; and
- a first cold recycle loop, wherein the first cold recycle loop passes through the cold box and is configured to transfer waste cold thermal energy from a system which is external to, but thermally integrated with, the cryogenic energy storage system, to the portion of the process stream in the ninth arrangement of conduits.

The system may include a cold box, via which waste cold thermal energy may be transferred from an external system to the liquefaction unit. Applying the waste cold thermal energy from an external source via the cold box to the portion of the gaseous recycle air compressor output stream (that subsequently passes through the expansion device to reach the phase separator) improves the liquefaction process. The lower the amount of heat of compression captured from the recycle air compressor via the ninth heat exchanger, the higher the temperature of the gaseous recycle air compressor output stream, which then requires more cold thermal energy. This cold thermal energy is provided either by expanding a portion of the process stream of the liquefaction unit and using it as a cooling stream for the rest of the process stream of the liquefaction unit and/or by conveying waste cold thermal energy from a source external to the CES system. The higher the availability of the waste cold thermal energy, the lower the mass flow rate required by the diverted portion of the process stream of the liquefaction unit. Consequently, maximising the capture of the heat of compression generated by the recycle air compressor lowers the power input of the liquefaction unit and increases the power output of the power recovery unit by supplying the heat of compression to the power recovery unit during the power recovery phase. This results in the increase of the round trip efficiency of the cryogenic energy storage system.

The same advantage applies to the method of recycling thermal energy which includes using waste cold thermal energy to cool down the second portion of the gaseous recycle air compressor output stream.

The cryogenic energy storage system may be configured such that the power recovery sub-system further comprises an evaporator and a compressor; the system further comprising:
- a second cold recycle loop passing through the evaporator and configured to transfer waste cold thermal energy from a system which is external to, but thermally integrated with, the cryogenic energy storage system, to at least a portion of the working fluid which passes from the output of the power recovery unit, through said evaporator and said compressor, and re-enters the power recovery unit.

The system may include using an evaporator in the power recovery sub-system to cool the working fluid which passes through the evaporator. An external source of waste cold may be used to cool a portion of the working fluid which is taken from the output of the power recovery unit before being compressed and merged with the working fluid upstream of the final expansion stage. Using waste cold thermal energy to cool this portion before it enters the compressor reduces the compression work input required to compress it. Merging this portion with the working fluid immediately upstream of the furthest downstream expansion stage increases the mass flow rate processed by said expansion stage. Depending upon the amount of heat of compression provided by the thermal energy storage device (that is in thermal connection with the furthest downstream expansion stage), the combined effect of the cooling of the portion of the output of the power recovery unit prior to its compression and of the increase of mass flow rate of the working fluid expanded through the furthest downstream expansion stage may result in an increase in the power output of the power recovery unit and thus in an increase of the round-trip efficiency of the cryogenic energy storage system. Both the heats of compression retrieved from the main air compressor and recycle air compressor and the increase of mass flow rate processed by the last expansion stage contribute to the increase of the expansion work output and thus the round trip efficiency of the cryogenic energy storage system. The same advantage applies to the method of recycling cold thermal energy which includes using waste cold thermal energy to cool a portion of the working fluid before it is compressed to reduce the work input to the compressor and it is merged with the working fluid upstream of the furthest downstream expansion stage.

The cryogenic energy storage system may be configured such that the main air compressor has different input and output pressures to those of the recycle air compressor and that the main air compressor and/or the recycle air compressor are adiabatic.

The inventors have discovered that by optimising the main air compressor and the recycle air compressor output pressures and allowing the main air compressor and the recycle air compressor to be adiabatic, it is possible to increase the round-trip efficiency of the CES system by having two distinct temperatures i.e. two distinct hot thermal energy grades.

Adiabatic compression implies the absence of heating/cooling during compression and in between the compression stages of a compressor. On one hand, adiabatic compression causes the increase of the power input of the liquefaction unit, as compression work increases with the temperature of the gaseous stream to be compressed. But on the other hand, the absence of coolers implies the absence of pressure drop introduced by coolers, and thus the decrease of the power input of the liquefaction unit. In addition, adiabatic compression allows for the highest temperature at the output of a compressor: the heats of compression retrieved from an adiabatic main air compressor and an adiabatic recycle air compressor are of higher grade than those retrieved from a main air compressor and a recycle air compressor that are not adiabatic. Accordingly, adiabatic compression allows for the increase of the power output of the power recovery unit. The net effect of having an adiabatic main air compressor and an adiabatic recycle air compressor is an increase in the round trip efficiency of the CES system. This conclusion is also valid if only one of the main air compressor or the recycle air compressor is adiabatic.

In a third aspect, the present invention provides a thermal energy recycle system, comprising:
a main air compressor;
a recycle air compressor;
a second thermal energy storage device;
a first thermal energy storage device;
a working fluid; and
a plurality of expansion stages, comprising a first and second subsets;
wherein the system is configured to capture the heat of compression produced by the main air compressor and store it in the second thermal energy storage device during a liquefaction phase, and to apply the heat of compression stored in the second thermal energy storage device to the working fluid upstream of each of the first subset of expansion stages during a power recovery phase, and
wherein the system is further configured to capture the heat of compression produced by the recycle air compressor and store it in the first thermal energy storage device during a liquefaction phase, and to apply the heat of compression stored in the first thermal energy storage device to the working fluid upstream of each of the second subset of expansion stages during a power recovery phase.

Storing the heat of compression from the main air compressor in a separate thermal energy storage device than that used to store the heat of compression from the recycle air compressor is advantageous since the temperature of the heats of compression are different, i.e. the main air compressor and the recycle air compressor are readily available sources of hot thermal energy at different temperatures, i.e. they are readily available sources of different grades of hot thermal energy.

Heat of compression from the main air compressor is captured and stored at a higher temperature than the heat of compression from the recycle air compressor. In other words, the heat of compression captured and stored from the main air compressor is of a higher grade than the heat of compression captured and stored from the recycle air compressor. It is therefore further advantageous to store the heat of compression from the main air compressor and recycle air compressor in different thermal energy storage devices, so that each thermal energy storage device can be optimised for the temperature of hot thermal energy it is designed to store.

The first thermal energy storage device is in thermal connection with the recycle air compressor and the second thermal energy storage device is in thermal connection with the main air compressor.

The first thermal energy storage device may be configured to store the lower grade hot thermal energy from the recycle air compressor. The first thermal energy storage device could preferably contain water or a mixture of water and glycol, which are optimal for storing lower grade hot thermal energy. The first thermal energy storage device could contain thermal oil or molten salts or be a packed bed.

The second thermal energy storage device may be configured to store the higher grade hot thermal energy from the main air compressor. The second thermal energy storage device could preferably contain thermal oil or molten salts or be a packed bed, which are optimal for storing higher grade hot thermal energy. The second thermal energy storage device could contain water or a mixture of water and glycol.

Pluralities of expansion stages can be organised into subsets of expansion stages, these subsets being defined in that the expansion stages of a certain subset are pre-stage heated by the same thermal energy storage device.

A subset of expansion stages may include one expansion stage. Alternatively, a subset of expansion stages can include a plurality of expansion stages, but preferably no more than three.

Each expansion stage may be pre-heated by a heat exchanger. Preferably these heat exchangers transfer hot thermal energy from either the first thermal energy storage device or the second thermal energy storage device to the working fluid of the power recovery unit.

In a fourth aspect, the present invention relates to a method for recycling thermal energy in a cryogenic energy storage system, the method comprising:
providing a liquefaction sub-system comprising:
a main air compressor;
a recycle air compressor;
a second thermal energy storage device; and
a first thermal energy storage device;
providing a power recovery sub-system comprising:
a working fluid; and
a plurality of expansion stages, comprising a first and second subsets;
capturing the heat of compression from the main air compressor and storing it in the second thermal energy storage device;
capturing the heat of compression from the recycle air compressor and storing it in the first thermal energy storage device;
applying the stored heat of compression in the second thermal energy storage device to the working fluid upstream of each of the first subset of expansion stages; and
applying the stored heat of compression in the first thermal energy storage device to the working fluid upstream of each of the second subset of expansion stages.

The method and the cryogenic energy storage system may be configured such that the co-located process is a liquid natural gas (LNG) regasification terminal.

The method and the cryogenic energy storage system may be configured such that the second thermal energy storage device is configured to capture, store, and apply heat of compression at a temperature different to that of the heat of compression captured, stored, and applied by the first thermal energy storage device.

Storing the heats of compression from the main air compressor and the recycle air compressor in this way avoids loss of hot thermal energy grade by mixing. Mixing would also lead to the resulting stored temperature being somewhere between the higher main air compressor and lower recycle air compressor temperatures. This may be inefficient to store in either of the thermal energy storage devices described above.

The working fluid may be the working fluid of the power recovery unit.

The first and fourth heat transfer fluids may be the fluids flowing through the first thermal energy storage device.

The second and third heat transfer fluids may be the fluids flowing through the second thermal energy storage device.

The process stream may be the process stream of the liquefaction unit.

BRIEF DESCRIPTION OF THE DRAWINGS

Embodiments of the present invention will now be described with reference to the figures in which:

FIG. 4B shows a thermally-integrated CES system according to the invention receiving some waste cold thermal energy from a LNG regasification terminal, that displays a main air compressor-related and recycle air compressor-related TESDs storing at least some heat of compression, another TESD storing at least some cold thermal energy embedded in the cryogen, two LNG-based cooling loops and a power island according to the invention that may be as shown in any one of FIGS. 6A to 6F.

FIG. 5A-5F depict six alternative embodiments of a power island for a standalone CES system according to the invention.

DETAILED DESCRIPTION OF THE INVENTION

Figure 1:
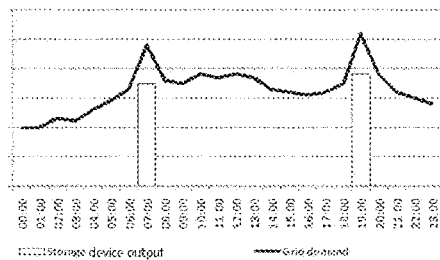
FIG. 1 shows a conventional generating regime of an energy storage device.
Figure 2:
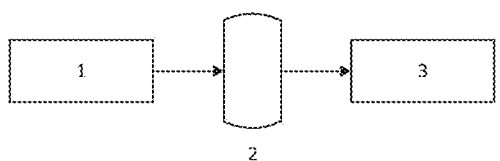
FIG. 2 shows a schematic view of a conventional cryogenic energy storage (CES) system.
Figure 3A:
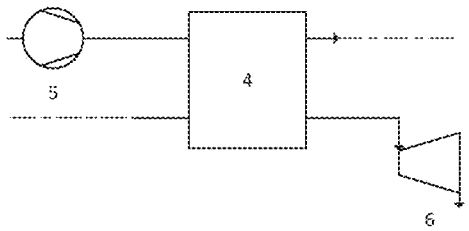
FIG. 3A. shows direct heat exchange between the process fluid of a liquefaction unit and a packed-bed TESD and between the packed-bed TESD and the working fluid of a power recovery unit.
Figure 3B:
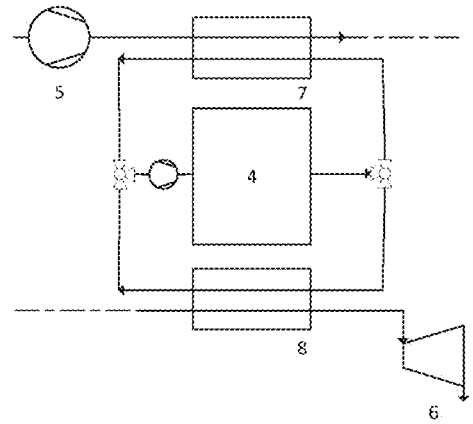
FIG. 3B. shows indirect heat exchange between the process fluid of a liquefaction unit and a packed-bed TESD and between the packed-bed TESD and the working fluid of a power recovery unit.
Figure 3C:
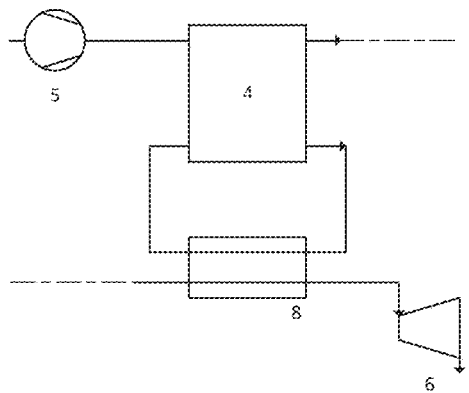
FIG. 3C shows a direct heat exchange between the process fluid of a liquefaction unit and a packed-bed TESD and subsequently an indirect heat exchange between the packed-bed TESD and the working fluid of a power recovery unit.
Figure 3D:
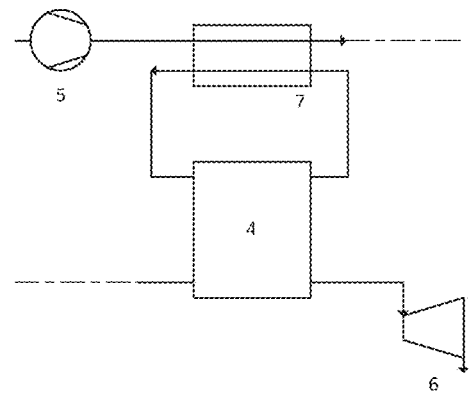
FIG. 3D shows an indirect heat exchange between the process fluid of a liquefaction unit and a packed-bed TESD and subsequently a direct heat exchange between the packed-bed TESD and the working fluid of a power recovery unit.
Figure 4A:
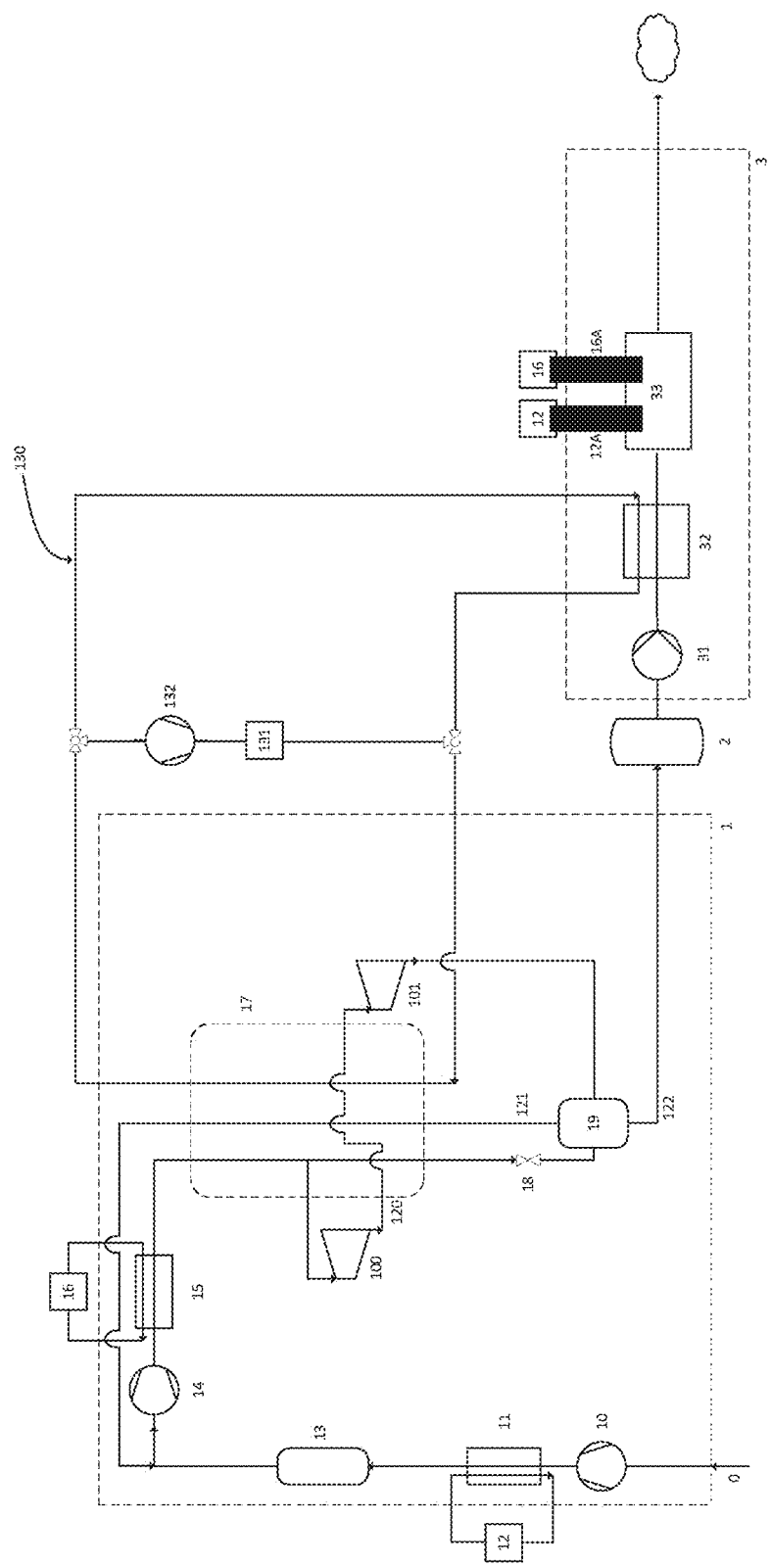
FIG. 4A shows a standalone CES system according to the invention displaying a main air compressor-related and a recycle air compressor-related TESDs storing at least some heat of compression, another TESD storing at least some of the cold thermal energy embedded in the cryogen and a power island according to the invention that may be as shown in any one of FIGS. 5A to 5F.

A first embodiment of the invention is depicted in FIG. 4A and is directed to a standalone CES system displaying a liquefaction unit (1), a cryogenic tank (2) and a power recovery unit (3), which exhibits a power island (33) that could adopt any of the configurations depicted in FIG. 5A-5F, each of which is also an embodiment of the present invention. This standalone CES system possesses a heat-of-compression recycle device (11, 12, 15, 16, 12A, 16A) and a first separate closed double loop (130) which transfers the cold thermal energy embedded in the cryogen to the process stream of the liquefaction unit. The hot thermal energy provided to the working fluid of the power recovery unit via at least one power recovery heater may stem from the heat-of-compression recycle device through the second (11, 12, 12A) and third (15, 16, 16A) separate closed double loops. Although it is a standalone system, it is possible to have this embodiment using not only the hot thermal energy provided by the heat-of-compression recycle device to heat the working fluid of the power recovery unit via at least one power recovery heater, but also some waste hot thermal energy from at least one system co-located with and external to the CES system producing waste hot thermal energy, such as nuclear power plants, thermal power plants (e.g. open cycle gas turbine gas plants; combined cycle gas turbine plants and conventional steam cycles), data centres, steel works, furnaces used by ceramics, terra cotta, glass-making and cement-making industries.

The liquefaction unit (1) turns a stream of ambient air (0) into liquid air that is subsequently stored in the cryogen tank (2). The liquefaction unit (1) may comprise at least a main air compressor (10), a first heat-of-compression capturing heat exchanger (11), a main air compressor-related TESD (12) to store the heat of compression stemming from the main air compressor, an Air Purification Unit (APU) (13), a recycle air compressor (14), a second heat-of-compression capturing heat exchanger (15), a recycle air compressor-related TESD (16) to store the heat of compression stemming from the recycle air compressor, a cold box (17), a set of two liquefaction turbo-expanders (100, 101) placed in series, an expansion device (18) (e.g. a Joule-Thomson valve, a wet turbo-expander, etc.), a phase separator (19), a first conduit to convey the process stream of the liquefaction unit from the main air compressor going through the first heat-of-compression capturing heat exchanger, the APU, the recycle air compressor, the second heat-of-compression capturing heat exchanger, the cold box, the expansion device to the phase separator, a second conduit to divert part of the process stream of the liquefaction unit (conveyed by the first conduit) when crossing the cold box, a third conduit to convey the gaseous output stream of the phase separator (121) through the cold box to the recycle air compressor input (the merging occurring downstream of the APU and upstream of the recycle air compressor), a fourth conduit to convey the liquid output stream of the phase separator (122) to the cryogenic tank (2) and a fifth conduit to convey the heat transfer fluid circulating through the first separate closed double loop (130) through the cold box.

The main air compressor compresses ambient air (i.e. the air present in the atmosphere surrounding the CES system) from the ambient air pressure to a first pressure, which may be between two bar to tens of bar, prior to its purification in the APU, which is placed downstream of the main air compressor. The APU is made up of adsorption vessels able to adsorb hydrocarbons, water and carbon dioxide to obtain cleaned air at its output. Downstream of the APU, the recycle air compressor compresses cleaned air from a pressure slightly below the first pressure (to take into account the pressure drop introduced by the APU) to a second pressure, which equals tens of bars with an upper limit of 200 bar.

The cleaned air processed by the recycle air compressor encompasses not only the cleaned air output by the APU but also the cleaned air stemming from the gaseous output stream (121) of the phase separator, whose cold thermal energy has been stripped out when going through the cold box (before reaching the recycle air compressor) to be transferred to the process stream of the liquefaction unit conveyed by the first conduit. Consequently, the air mass flow output by the recycle air compressor is greater than that of the main air compressor and affects the amount of generated heat of compression.

The cleaned air output by the recycle air compressor is conveyed through the cold box to be cooled, then through the expansion device to decrease its pressure to the first pressure, or to a pressure greater than the first pressure and lower than the second pressure, allowing its total or partial liquefaction depending upon the conditions under which the stream output by the recycle air compressor was subjected (i.e. pressure of the stream output by the recycle air compressor relative to the critical pressure of air, amount of cold thermal energy supplied through the cold box, pressure change via expansion through the expansion device, etc.). The gaseous and liquid mixture, output by the expansion device (18), is subsequently conveyed to a phase separator where it separates into a liquid phase and a gaseous phase.

Part (120) of the process stream of the liquefaction unit (conveyed by the first conduit) is diverted while crossing the cold box via the second conduit which exits the cold box to go through a first liquefaction turbo-expander (100) and re-enters the cold box (via a re-entry point controlled by the amount of cooling embedded in the liquefaction turbo-expander (100) output) to cool the process stream of the liquefaction unit (conveyed by the first conduit) on a given length of the cold box, after which it exits the cold box and is processed by the second liquefaction turbo-expander (101). The gas/liquid mixture output by the second liquefaction turbo-expander (101) is then conveyed to the phase separator.

The gaseous output stream of the phase separator conveyed by the third conduit comprises the gaseous phase resulting from the expansion of the stream conveyed by the first conduit through the expansion device (18) and the gaseous phase resulting from the stream conveyed by the second conduit that is subjected to two consecutive expansions through the two liquefaction turbo-expanders (100, 101) placed in series and subsequently injected into the phase separator.

The gaseous output stream (121) of the phase separator goes through the cold box to transfer its cold thermal energy to the process stream of the liquefaction unit conveyed by the first conduit and is subsequently conveyed to the recycle air compressor input (the merging occurring downstream of the APU and upstream of the recycle air compressor).

The liquid output stream (122) of the phase separator is conveyed by the fourth conduit to the cryogenic tank (2).

The term separate closed double loop is closely associated with the presence of a TESD: one single loop through which a heat transfer fluid circulates captures the thermal energy from one fluid and the other single loop through which another heat transfer fluid circulates supplies this thermal energy to another fluid. Said single loops could be of simple design i.e. each exhibiting a circulation pump, an arrangement of conduits that goes through the TESD, and a heat transfer fluid. Or said single loops may have the same heat transfer fluid and may share a circulation pump and part of their arrangement of conduits, said part going through the TESD which involves the presence of valves (e.g. three-way valves) as shown in the first separate closed double loop (130) of FIG. 4A.

The single loops of the first separate closed double loop (130) shares a TESD (131), part of their arrangement of conduits, a heat transfer fluid and a circulation pump (132) to circulate the heat transfer fluid through both single loops. During the power recovery phase, one single loop allows for capturing at least part of the cold thermal energy embedded in the cryogen via the evaporator (32) after being pumped via the cryogen pump (31), and storing it in the TESD (131). During the liquefaction phase, the other single loop allows for providing the cold thermal energy stored in the TESD (131) to the process stream of the liquefaction unit via the fifth conduit.

The process stream of the liquefaction unit conveyed by the first conduit is cooled down by the streams conveyed by the second conduit, the third conduit and the fifth conduit so as to be partially liquefied after passing through the expansion device (18).

The cryogen produced by the liquefaction unit during the liquefaction phase (i.e. the liquid output stream (122) of the phase separator) is conveyed to the cryogenic tank (2). During the power recovery phase, some cryogen contained in the cryogenic tank is conveyed to the power recovery unit (3): it is pumped to a high pressure by the cryogenic pump (31), heated in the evaporator (32) and transferred to a power island (33) in which it is superheated via at least one power recovery heater and expanded via at least one expansion stage of at least one turbo-expander. Whatever the amount of turbo-expanders present in the power island is, they are all mechanically coupled to a generator to produce electricity.

The power island (33) may adopt any of the configurations depicted by FIG. 5A-5F, each of which is also an embodiment of the present invention.

The turbo-expander of the power recovery unit may preferably display four expansion stages.

Figure 5A:
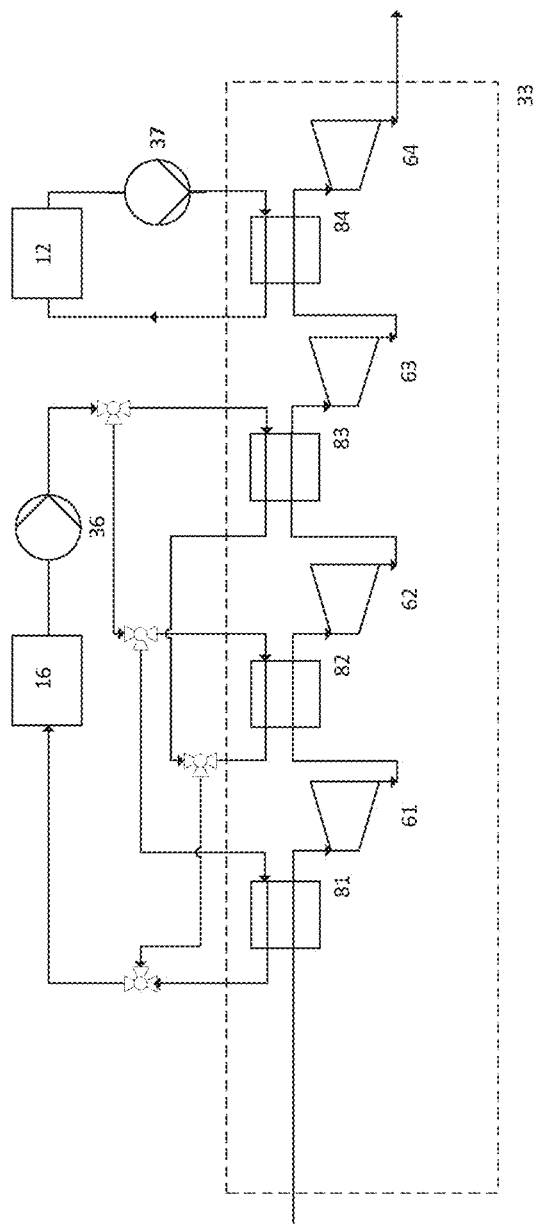
Figure 5B:
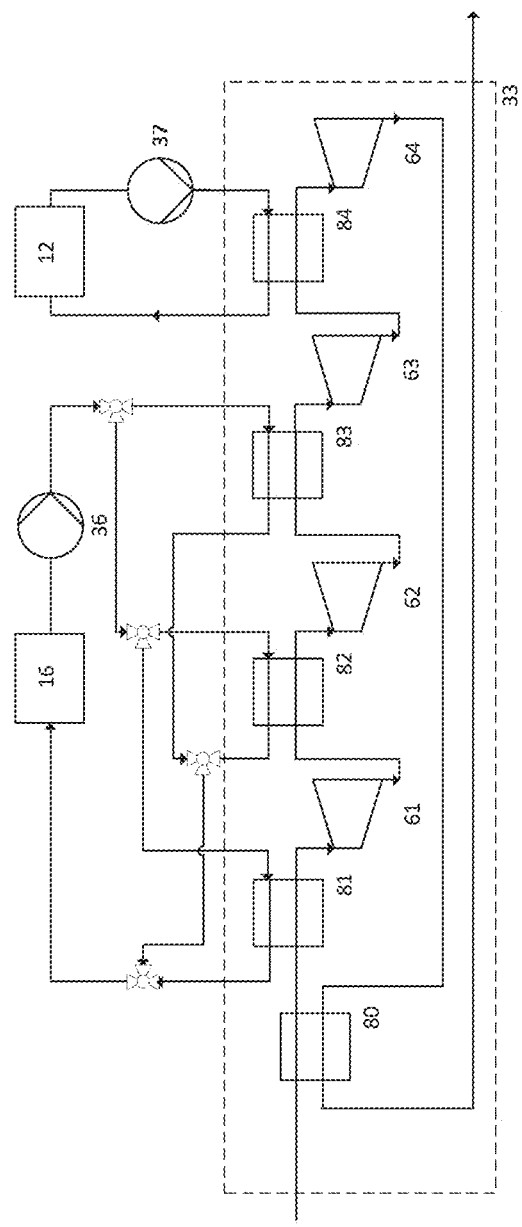

The recycle air compressor-related TESD (16) may supply hot thermal energy to the working fluid of the power recovery prior to each of the first three-expansion stages (61, 62, 63) via power recovery heaters (81, 82, 83) while the main air compressor-related TESD (12) may supply hot thermal energy to the working fluid of the power recovery unit prior to the last (or fourth) expansion stage (64) via power recovery heater (84) (See FIG. 5A). An extra power recovery heater (80) may be placed upstream of the power recovery heater (81) upstream of the first expansion stage (61), wherein the working fluid of the power recovery unit may be heated by the output of the fourth expansion stage (64) prior to be heated further by the power recovery heater (81) placed upstream of the first expansion stage (See FIG. 5B). After having transferred its hot thermal energy to the working fluid of the power recovery unit via the extra power recovery heater (80), the output of the fourth expansion stage may be discharged into the atmosphere or used to regenerate the adsorption vessels of the APU.

Alternatively, the main air compressor-related TESD (12) may supply hot thermal energy to the working fluid of the power recovery unit prior to the first expansion stage (6100) via a power recovery heater (8100) while the recycle air compressor-related TESD (16) may supply hot thermal energy to the working fluid of the power recovery unit prior to the each of the last three expansion stages (6200, 6300, 6400) via power recovery heaters (8200, 8300, 8400) (See FIG. 5E). An extra power recovery heater (8000) may be placed upstream of the power recovery heater (8100) upstream of the first expansion stage (6100), wherein the working fluid of the power recovery unit may be heated by the output of the fourth expansion stage (6400) prior to be heated further by the power recovery heater (8100) placed upstream of the first expansion stage (6100) (See FIG. 5F). After having transferred its hot thermal energy to the working fluid of the power recovery unit via the extra power recovery heater, the output of the fourth expansion stage may be discharged into the atmosphere or used to regenerate the adsorption vessels of the APU.

The turbo-expander may display five expansion stages.

Figure 5C:
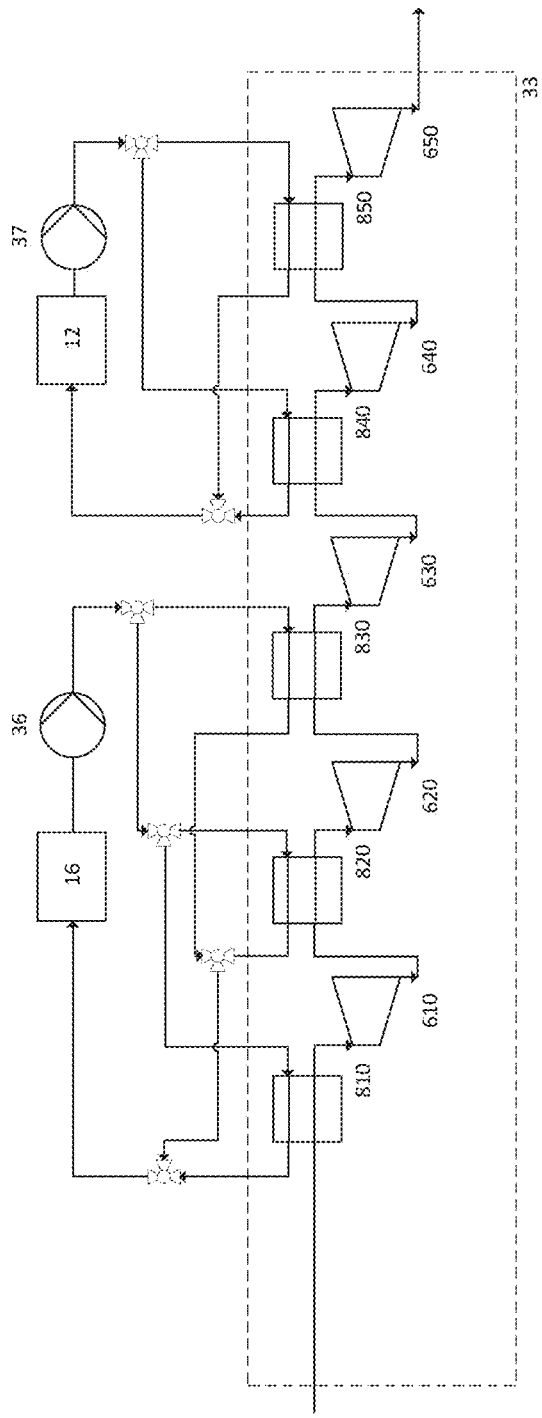
Figure 5D:
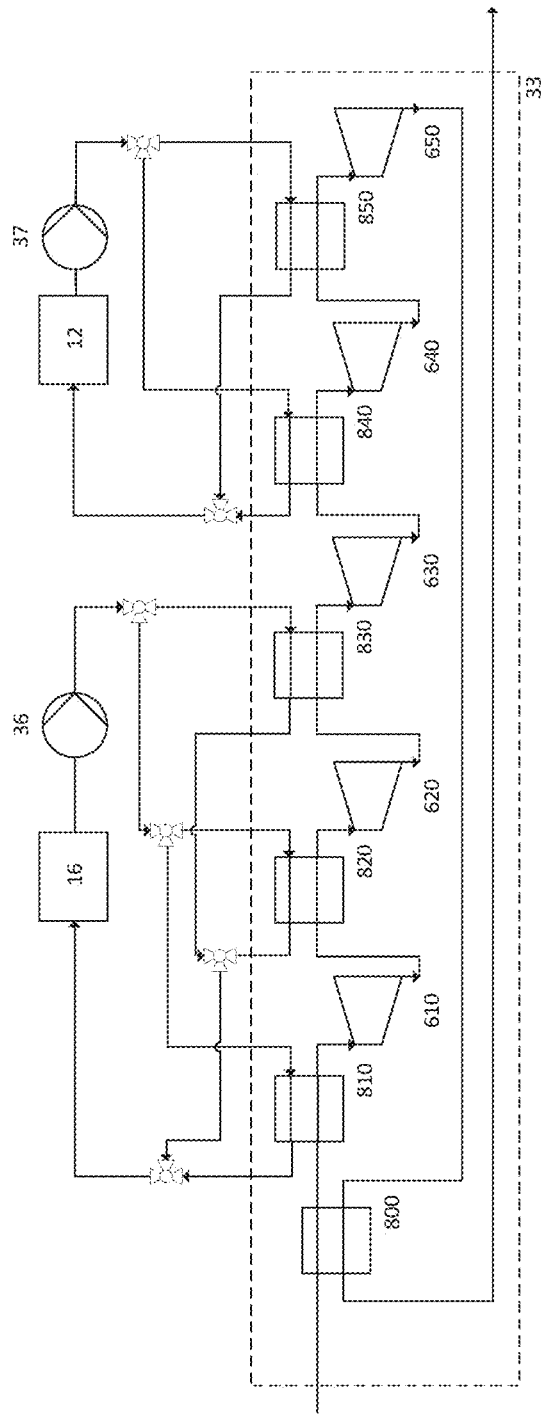

The recycle air compressor-related TESD (16) may supply hot thermal energy to the working fluid of the power recovery unit prior to each of the first three-expansion stages (610, 620, 630) via power recovery heaters (810, 820, 830) while the main air compressor-related TESD (12) may supply hot thermal energy to the working fluid of the power recovery unit prior to the last two (or fourth and fifth) expansion stages (640, 650) (See FIG. 5C). An extra power recovery heater (800) may be placed upstream of the power recovery heater (810) upstream of first expansion stage (610) wherein the working fluid of the power recovery unit may be heated by the output of the fifth expansion stage prior to be heated further by the power recovery heater (810) placed upstream of the first expansion stage (610) (See FIG. 5D). After having transferred its hot thermal energy to the working fluid of the power recovery unit via the extra power recovery heater, the output of the fifth expansion stage may be discharged into the atmosphere or used to regenerate the adsorption vessels of the APU.

The extra power recovery heater (80, 800, 8000) may be placed downstream of the evaporator (32).

A second embodiment of the invention is depicted in FIG. 4B and is directed to a thermally-integrated system displaying a liquefaction unit (1), a cryogenic tank (2) and a power recovery unit (3) which exhibits a power island (330) that could adopt any of the configurations depicted in FIG. 6A-6F, each of which is also an embodiment of the present invention. This thermally-integrated CES system possesses a heat-of-compression recycle device (11, 12, 15, 16, 12A, 16A) and a first separate closed double loop (130) which transfers the cold thermal energy embedded in the cryogen to the process stream of the liquefaction unit. This CES system receives some waste cold thermal energy from a LNG regasification terminal external to and co-located with said CES system via a first (401) and a second (403) separate closed single loops. The waste cold thermal energy provided by the LNG regasification terminal does not fulfil entirely the needs of the liquefaction unit, which still requires the presence of the first separate closed double loop (130). The reference number 400 appended next to several streams refers to LNG streams.

The hot thermal energy provided to the working fluid of the power recovery unit via at least one power recovery heater may stem from the heat-of-compression recycle device through the second (11, 12 12A) and the third (15, 16, 16A) separate closed double loops. The hot thermal energy provided to the working fluid of the power recovery unit via at least one power recovery heater may stem from the heat-of-compression recycle device and at least one system co-located with and external to the CES system producing waste hot thermal energy, such as nuclear power plants, thermal power plants (e.g. open cycle gas turbine gas plants; combined cycle gas turbine plants and conventional steam cycles), data centres, steel works, furnaces used by ceramics, terra cotta, glass-making and cement-making industries.

The liquefaction unit (1) turns a stream of ambient air (0) into liquid air that is subsequently stored in the cryogen tank (2). The liquefaction unit (1) may comprise at least a main air compressor (10), a first heat-of-compression capturing heat exchanger (11), a main air compressor-related TESD (12) to store the heat of compression stemming from the main air compressor (10), an Air Purification Unit (APU) (13), a recycle air compressor (14), a second heat-of-compression capturing heat exchanger (15), a recycle air compressor-related TESD (16) to store the heat of compression stemming from the recycle air compressor, a cold box (17), a liquefaction turbo-expander (102), an expansion device (18) (e.g. a Joule-Thomson valve, a wet turbo-expander, etc.), a phase separator (19), a first conduit to convey the process stream of the liquefaction unit from the main air compressor going through the first heat-of-compression capturing heat exchanger, the APU, the recycle air compressor, the second heat-of-compression capturing heat exchanger, the cold box and the expansion device to the phase separator, a second conduit to divert part of the process stream of the liquefaction unit (conveyed by the first conduit) while crossing the cold box, a third conduit to convey the gaseous output stream (124) of the phase separator to the atmosphere, a fourth conduit to convey the liquid output stream (122) of the phase separator to the cryogenic tank (2), a fifth conduit to convey the heat transfer fluid of the first separate closed double loop (130) through the cold box, a sixth conduit to convey the heat transfer fluid of the first separate closed single loop (401) through the cold box.

The main air compressor compresses ambient air (i.e. the air present in the atmosphere surrounding the CES system) from the ambient air pressure to a first pressure, which may be between two bar to tens of bar, prior to its purification in the APU, which is placed downstream of the main air compressor. The APU is made up of adsorption vessels able to adsorb hydrocarbons, water and carbon dioxide to obtain cleaned air at its output. Downstream of the APU, the recycle air compressor compresses cleaned air from a pressure slightly below the first pressure (to take into account the pressure drop introduced by the APU) to a second pressure, which equals tens of bars with an upper limit of 200 bar.

The cleaned air processed by the recycle air compressor encompasses not only the cleaned air output by the APU but also the cleaned air stemming from the gaseous stream (123) output by the liquefaction turbo-expander (102), whose cold thermal energy has been stripped out when going through the cold box (before reaching the recycle air compressor) to be transferred to the process stream of the liquefaction unit conveyed by the first conduit. Consequently, the air mass flow output by the recycle air compressor is greater than that of the main air compressor and affects the amount of generated heat of compression.

The cleaned air output by the recycle air compressor (conveyed by the first conduit) is conveyed through the cold box (17) to be cooled, then through the expansion device (18) to decrease its pressure to the first pressure, or to a pressure greater than the first pressure and lower than the second pressure, allowing its total liquefaction. The liquid stream output by the expansion device (18) is subsequently conveyed to a phase separator.

Part (123) of the process stream of the liquefaction unit (conveyed by the first conduit) is diverted while crossing the cold box via the second conduit which exits the cold box to go through the liquefaction turbo-expander (102) to re-enter the cold box via its cold side (i.e. lower side of the cold box) to cool the rest of the process stream of the liquefaction unit conveyed by the first conduit and exits the cold box via its warm side to finally merge with the first conduit downstream of the APU and upstream of the recycle air compressor.

The third conduit conveying the gaseous output stream (124) of the phase separator allows any gas present after expansion of the process stream of the liquefaction unit through the expansion device (18) to escape from the phase separator to the atmosphere. This situation normally occurs when the CES system is started up as total liquefaction is only achieved when a steady state is established.

The liquid output stream (122) of the phase separator is conveyed by the fourth conduit to the cryogenic tank (2).

The single loops of the first separate closed double loop (130) shares a TESD (131), part of their arrangement of conduits, a heat transfer fluid and a circulation pump (132) to circulate the heat transfer fluid through both single loops. During the power recovery phase, one single loop allows for capturing at least part of the cold thermal energy embedded in the cryogen via the evaporator (32) after being pumped via the cryogen pump (31), and storing it in the TESD (131). During the liquefaction phase, the other single loop allows for providing the cold thermal energy stored in the TESD (131) to the process stream of the liquefaction unit via the fifth conduit.

The first separate closed single loop (401) is a refrigeration loop that increases the grade of the waste cold thermal energy supplied by the LNG stream (400): the heat transfer fluid (circulating through the first separate closed single loop (401)) is compressed then cooled by the LNG stream (400) via heat exchanger (402), then compressed again and cooled again by the LNG stream (400) via heat exchanger 402), then expanded through a turbo-expander and heated while crossing the entire cold box (going from its cold side to its warm side) by the process stream of the liquefaction unit that is then cooled down.

The process stream of the liquefaction unit conveyed by the first conduit is cooled down by the streams conveyed by the second conduit, the fifth conduit and the sixth conduit so as to be entirely liquefied after passing through the expansion device (18).

The cryogen produced by the liquefaction unit during the liquefaction phase (i.e. the liquid output stream (122) of the phase separator) is conveyed to the cryogenic tank (2). During the power recovery phase, some cryogen contained in the cryogenic tank is conveyed to the power recovery unit (3): it is pumped to a high pressure by the cryogenic pump (31), heated in the evaporator (32) and transferred to a power island (330) in which it is superheated via at least one power recovery heater and expanded via at least one expansion stage of at least one turbo-expander. Whatever the amount of turbo-expanders present in the power island is, they are all mechanically coupled to a generator to produce electricity. Nevertheless, the power recovery unit of the second embodiment is different to that of the first embodiment with respect to its configuration.

The power recovery unit (3) is thermally interacting with the second separate closed single loop (403). The second separate closed single loop (403) contains a recirculation pump to circulate the heat transfer fluid which is cooled by the LNG stream (400) via heat exchanger (404) and heated by the stream (35) (diverted from the output of the power island (330)) via evaporator (320). Said diverted stream (35) is thus cooled by the heat transfer fluid of the second separate closed single loop to be subsequently compressed by a power recovery compressor (34) and re-injected into the power island (330), that may adopt any of the configurations depicted in FIG. 6A-6F, each of which is also an embodiment of the present invention.

The turbo-expander of the power recovery unit may preferably display four expansion stages as depicted in FIGS. 6A, 6B, 6E and 6F.

Figure 6A:
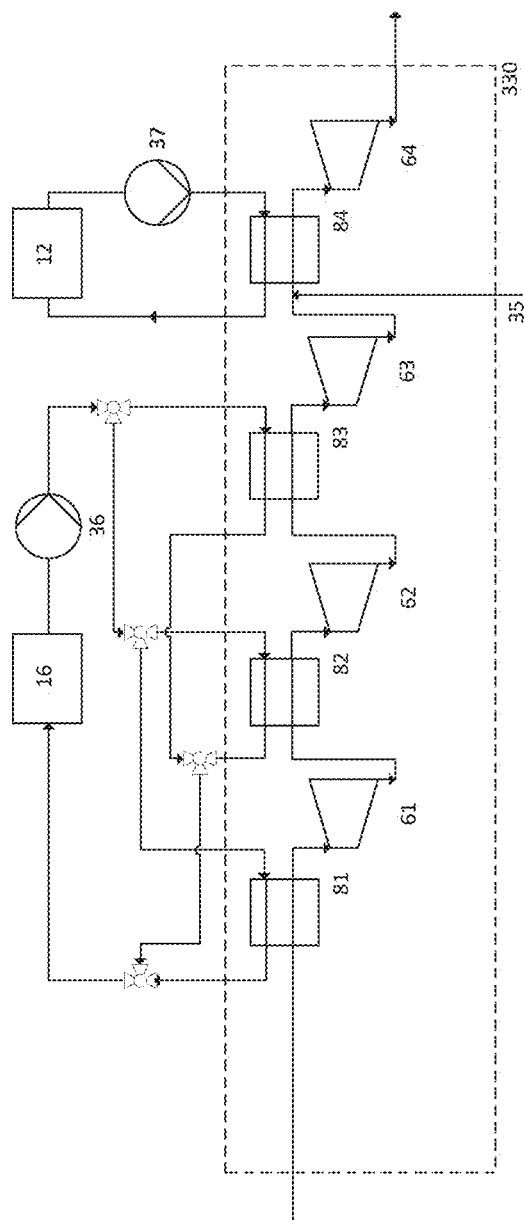
FIG. 6A-6F depict six alternative embodiments of a power island for a thermally-integrated system according to the invention.
Figure 6B:
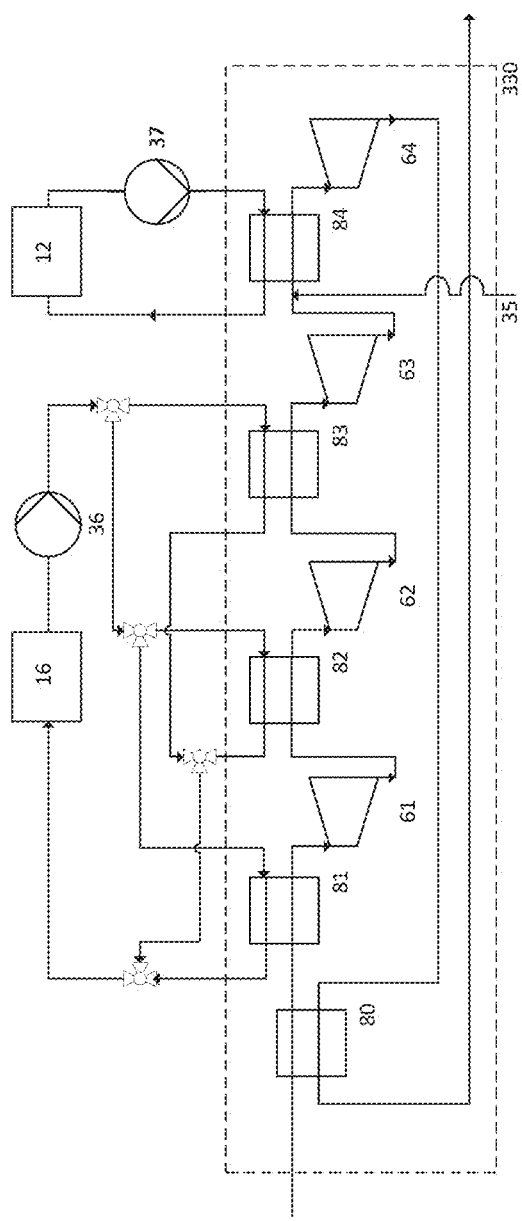
Figure 6C:
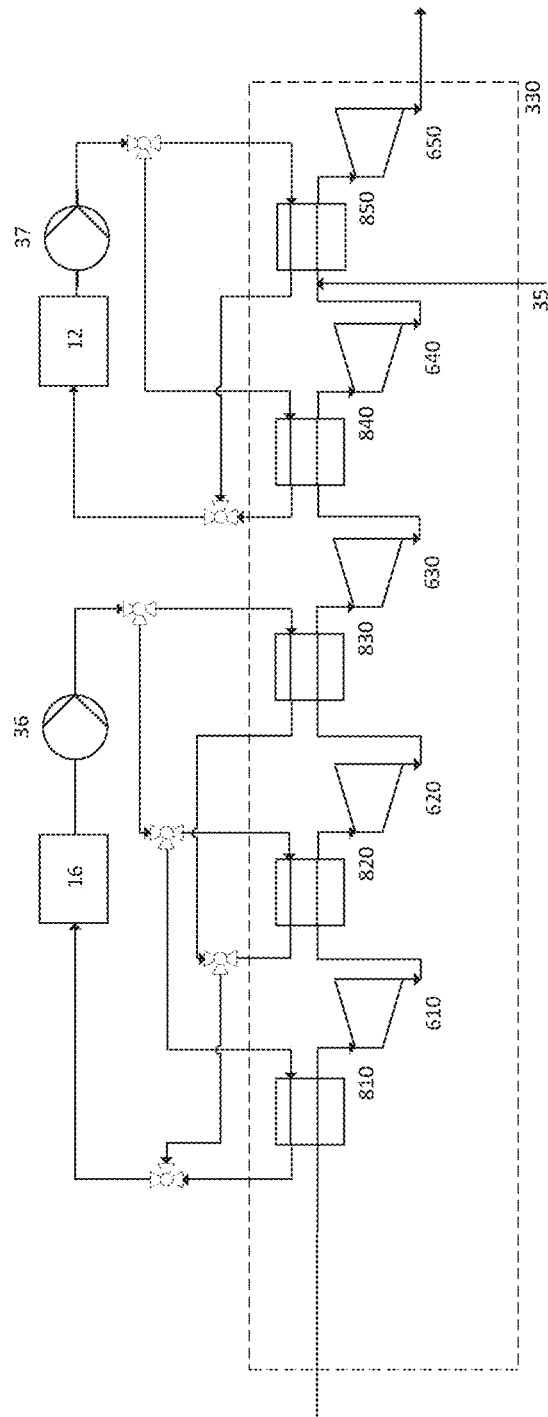
Figure 6D:
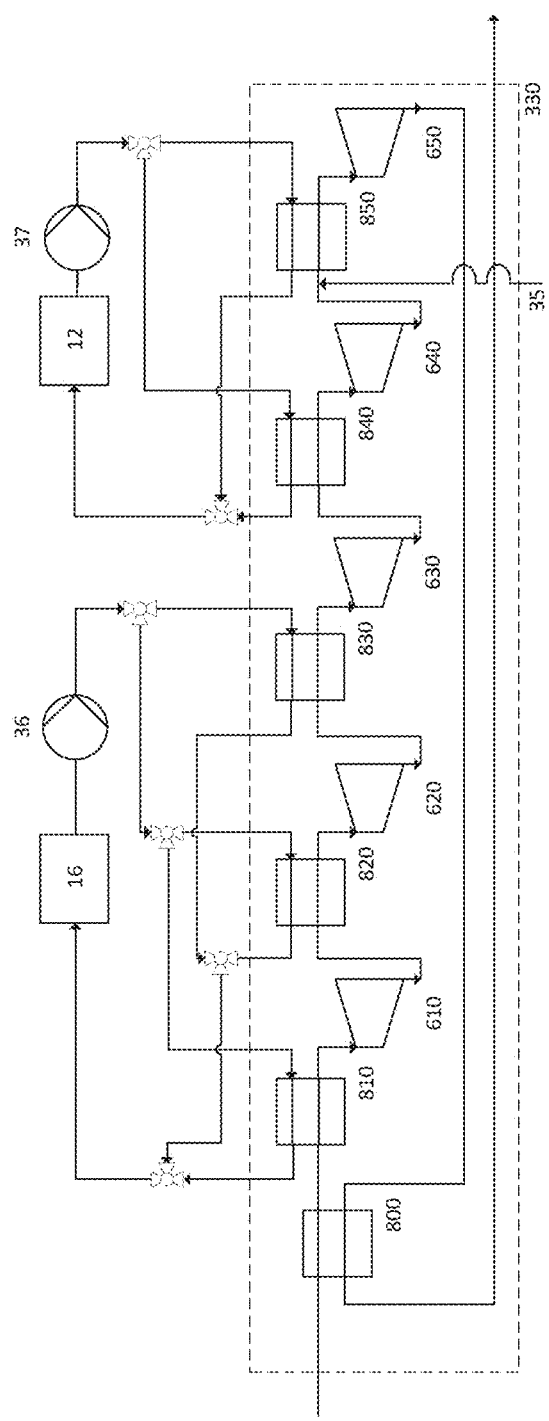
Figure 6E:
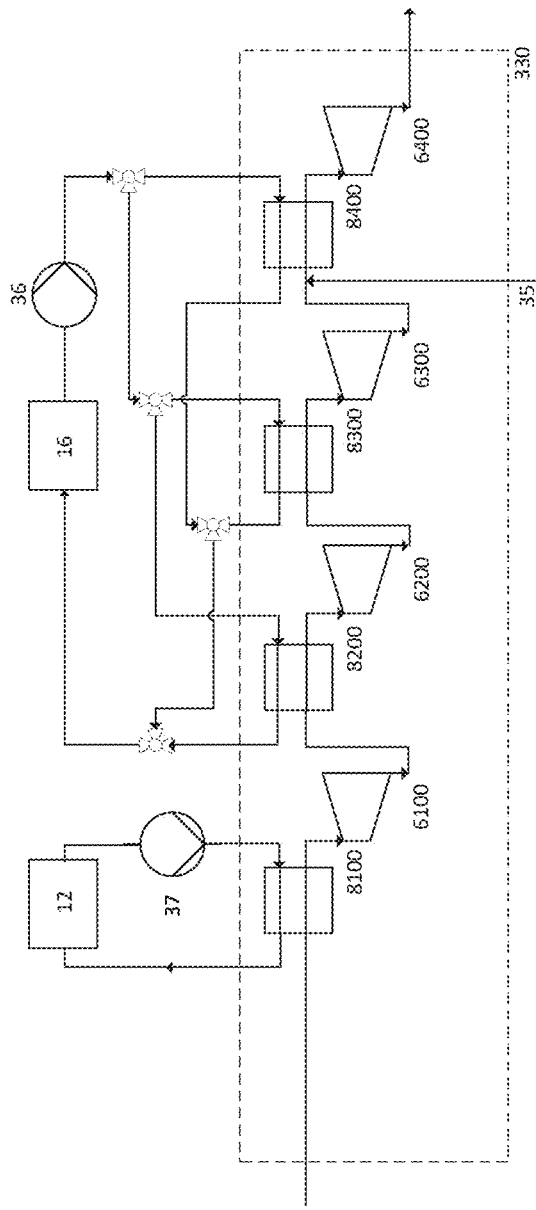

The turbo-expander of the power recovery unit may display five expansion stages as depicted in FIGS. 6C and 6D.

For each of the configurations 6A-6F, all embodiments of the present invention, the stream (35) diverted from the output of the power island (330) is cooled via the evaporator (32) then recompressed by a power recovery compressor (34) and injected back to the power island (330) downstream of the second-to-last expansion stage and upstream of the last power recovery heater and the last expansion stage. The work input of the compressor (34) is reduced by having its input cooled via evaporator (32) by the heat transfer fluid of the second separate closed single loop (403) and the work output of the last expansion stage is increased by augmenting the mass flow rate processed by the last expansion stage. The rest of the output stream of the power island may be exhausted to the atmosphere or may be used to regenerate the adsorption vessels of the APU (13).

Figure 6F:
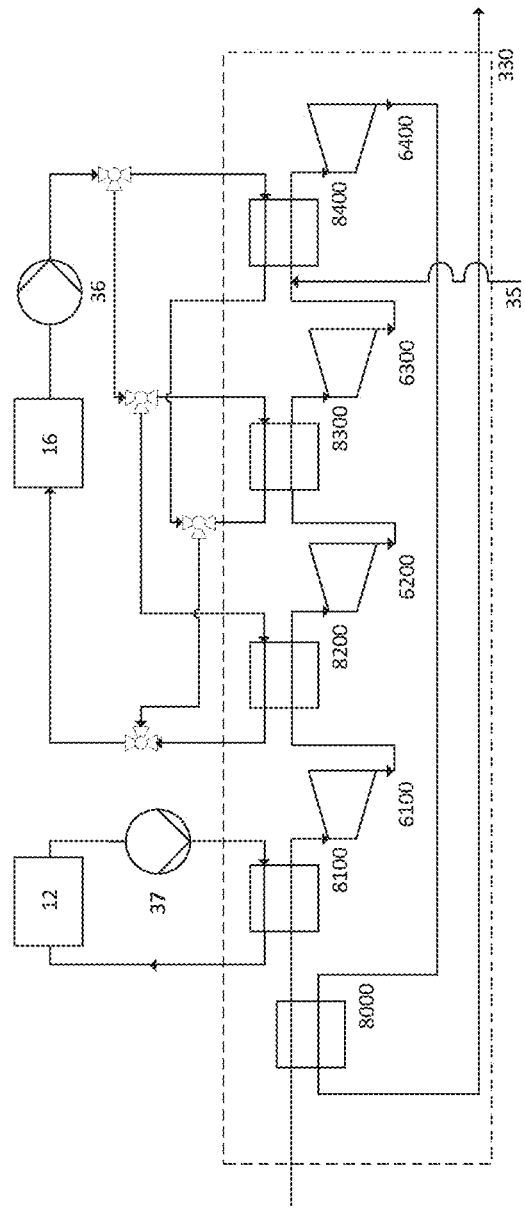

The power island may adopt any one of the configurations depicted in FIG. 6A-6F, each of which is also an embodiment of the present invention. One difference between FIGS. 5A and 6A, FIGS. 5B and 6B, FIGS. 5C and 6C, FIGS. 5D and 6D, FIGS. 5E and 6E, and FIGS. 5F and 6F is the presence of a stream (35) diverted from the output of the power island for FIG. 6A-6F, which is then cooled via evaporator (32) and recompressed by a compressor (34) and is injected back to the power island (330) downstream of the second-to-last expansion stage and upstream of the last power recovery heater (84, 850, 8400) and the last expansion stage (64, 650, 6400). FIGS. 6B, 6D and 6F displays the extra power recovery heater (80, 800, 8000). The extra power recovery heater (80, 800, 8000) may be placed upstream of the power recovery heater (81, 810, 8100) and upstream of the first expansion stage (61, 610, 6100), wherein the working fluid of the power recovery unit may be heated by the output of the last expansion stage (64, 650, 6400) prior to be heated further by the power recovery heater (81, 810, 8100) placed upstream of the first expansion stage.

The extra power recovery heater (80, 800, 8000) may be placed downstream of the evaporator (32).

Figure 4C:
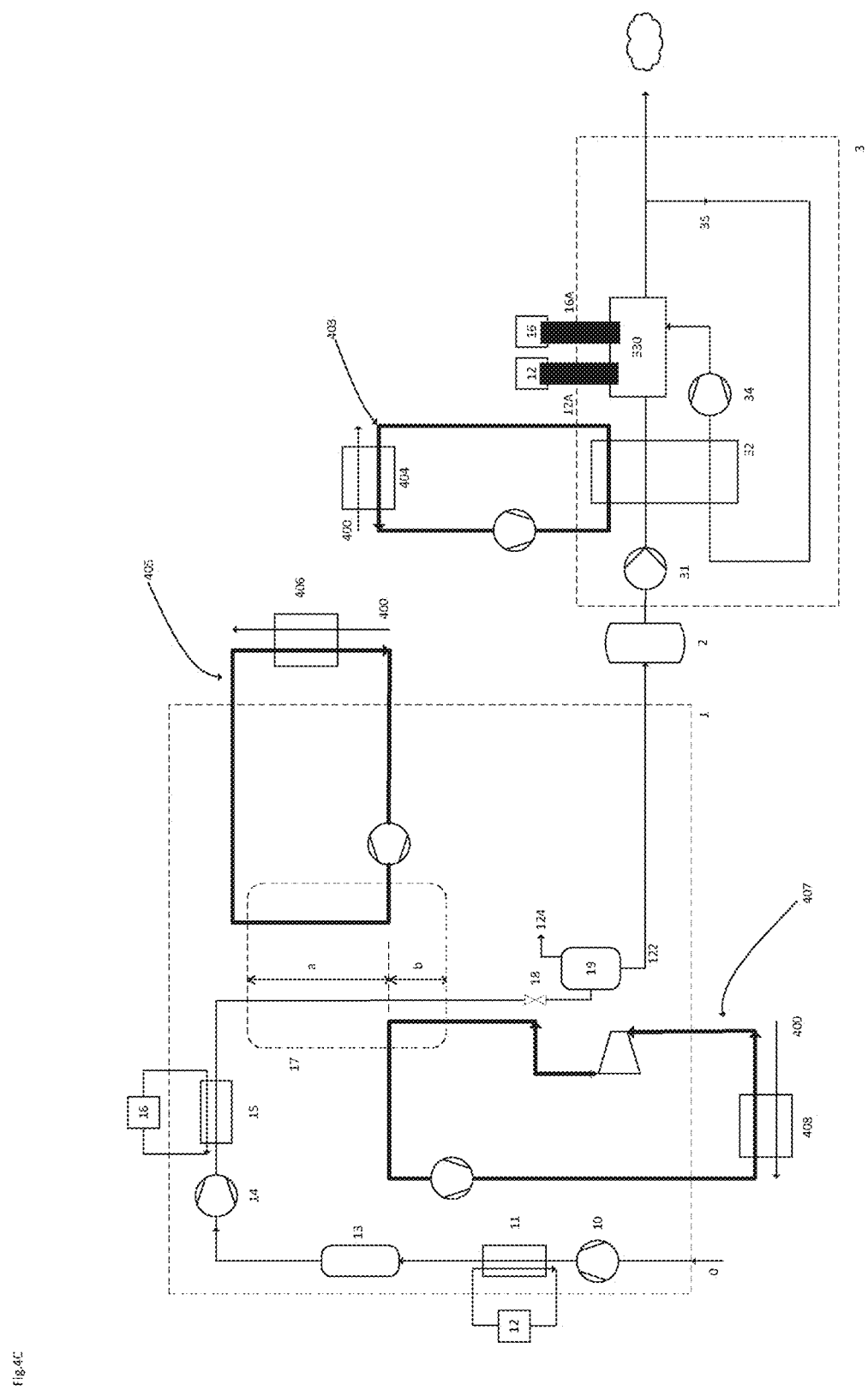
FIG. 4C shows a thermally-integrated CES system according to the invention receiving an abundant amount of cold thermal energy from a LNG regasification terminal, that displays a main air compressor-related and recycle air compressor-related TESDs storing at least some heat of compression, three LNG-based cooling loops and a power island according to the invention that may be as shown in any one of FIGS. 6A to 6F.

A third embodiment of the invention is depicted in FIG. 4C and is directed to a thermally-integrated system displaying a liquefaction unit (1), a cryogenic tank (2) and a power recovery unit (3) which exhibits a power island (330) that could adopt any of the configurations depicted in FIG. 6A-6F, each of which is also an embodiment of the present invention. This thermally-integrated CES system possesses a heat-of-compression recycle device (11, 12, 15, 16, 12A, 16A). This CES system receives a large amount of waste cold thermal energy from a LNG regasification terminal co-located with and external to said CES system. In other words, the amount of waste cold thermal energy provided by the LNG regasification terminal can fulfil the needs in cold thermal energy of the liquefaction unit in such a manner that there is no need for a first separate closed double loop (130) as displayed in the first and second embodiments. The waste cold thermal energy is transferred from LNG streams (400) to the liquefaction unit via the third (405) and fourth (407) separate closed single loops so as to liquefy entirely the process stream of the liquefaction unit.

The cold thermal energy embedded in the cryogen is directly used in the power recovery unit to cool down the part of the output stream of the power island (330) that is diverted to be recompressed by compressor (34) and injected back to the power island (330) downstream of the second-to-last expansion stage and upstream of the last power recovery heater (See FIG. 6A-6F: 84, 850, 8400) and the last expansion stage (See FIG. 6A-6F: 64, 650, 6400). The cold thermal energy provided by the second separate closed single loop (403) is used to cool further the output stream (35) in the evaporator (32).

The hot thermal energy provided to the working fluid of the power recovery unit via at least one power recovery heater may stem from the heat-of-compression recycle device through the second (11, 12, 12A) and third (15, 16, 16A) separate closed double loops. The hot thermal energy provided to the working fluid of the power recovery unit via at least one power recovery heater may stem from the heat-of-compression recycle device and at least one system co-located with and external to the CES system producing waste hot thermal energy, such as nuclear power plants, thermal power plants (e.g. open cycle gas turbine gas plants; combined cycle gas turbine plants and conventional steam cycles), data centres, steel works, furnaces used by ceramics, terra cotta, glass-making and cement-making industries.

The liquefaction unit (1) turns a stream of ambient air (0) into liquid air that is subsequently stored in the cryogen tank (2). The liquefaction unit (1) may comprise at least a main air compressor (10), a first heat-of-compression capturing heat exchanger (12), a main air compressor-related TESD (12) to store the heat of compression stemming from the main air compressor, an Air Purification Unit (APU) (13), a recycle air compressor (14), a second heat-of-compression capturing heat exchanger (15), a recycle air compressor-related TESD (16) to store the heat of compression stemming from the recycle air compressor, a cold box (17), an expansion device (18) (e.g. a Joule-Thomson valve, a wet turbo-expander, etc.), a phase separator (19), a first conduit to convey the process stream of the liquefaction unit from the main air compressor going through the first heat-of-compression capturing heat exchanger, the APU, the recycle air compressor, the second heat-of-compression capturing heat exchanger, the cold box, the expansion device to the phase separator, a second conduit to convey the gaseous output stream (124) of the phase separator to the atmosphere, a third conduit to convey the liquid output stream (122) of the phase separator to the cryogenic tank (2), a fourth conduit to convey the heat transfer fluid of the third separate closed single loop (405) through the cold box, a fifth conduit to convey the heat transfer fluid of the fourth separate closed single loop (407) through the cold box.

The main air compressor compresses ambient air (i.e. the air present in the atmosphere surrounding the CES system) from the ambient air pressure to a first pressure, which may be between two bar to tens of bar, prior to its purification in the APU, which is placed downstream of the main air compressor. The APU is made up of adsorption vessels able to adsorb hydrocarbons, water and carbon dioxide to obtain cleaned air at its output. Downstream of the APU, the recycle air compressor compresses cleaned air from a pressure slightly below the first pressure (to take into account the pressure drop introduced by the APU) to a second pressure, which equals tens of bars with an upper limit of 200 bar.

The cleaned air output by the recycle air compressor (conveyed by the first conduit) is conveyed through the cold box (17) to be cooled, then through the expansion device (18) to decrease its pressure to the first pressure, or to a pressure greater than the first pressure and lower than the second pressure, allowing its total liquefaction. The liquid stream output by the expansion device (18) is subsequently conveyed to a phase separator.

The second conduit conveying the gaseous output stream (124) of the phase separator allows any gas present after expansion of the process stream of the liquefaction unit through the expansion device (18) to escape from the phase separator to the atmosphere. This situation normally occurs when the CES system is started up as total liquefaction is only achieved when a steady state is established.

The liquid output stream (122) of the phase separator is conveyed by the third conduit to the cryogenic tank (2).

A heat transfer fluid is circulated through the third separate closed single loop (405) thanks to a circulation pump, retrieves some cold thermal energy from the LNG stream (400) via a heat exchanger (406) and enters the cold box at a distance "a" (See cold box of FIG. 4C) from the warm side of the cold box to give up its cold thermal energy to the process stream of the liquefaction unit (conveyed by the first conduit) which goes on the opposite direction. The length of the cold box equals to the sum of the distances "a" and "b".

In the fourth separate closed single loop (407) which is a refrigeration loop, its heat transfer fluid is compressed by a compressor, then cooled by the LNG stream (400) via a heat exchanger (408), expanded by a turbo-expander, heated in the cold box from its cold side to the distance "b" (at which it exits the cold box) by the process stream of the liquefaction unit conveyed by the first conduit.

The process stream of the liquefaction unit conveyed by the first conduit is cooled by the heat transfer fluids of the third (405) and fourth (407) separate closed single loops, conveyed by the second and third conduits, respectively so as to be entirely liquefied after passing the expansion device (18).

The cryogen produced by the liquefaction unit during the liquefaction phase (i.e. the liquid output stream (122) of the phase separator) is conveyed to the cryogenic tank (2). During the power recovery phase, some cryogen contained in the cryogenic tank is conveyed to the power recovery unit (3): it is pumped to a high pressure by the cryogenic pump (31), heated in the evaporator (32) and transferred to a power island (330) in which it is superheated via at least one power recovery heater and expanded via at least one expansion stage of at least one turbo-expander. Whatever the amount of turbo-expanders present in the power island is, they are all mechanically coupled to a generator to produce electricity. Nevertheless, the power recovery unit of the third embodiment is different to that of the first embodiment with respect to its configuration, but similar to that of the second embodiment.

The power recovery unit (3) is thermally interacting with the second separate closed single loop (403). The second separate closed single loop (403) contains a recirculation pump to circulate a heat transfer fluid which is cooled by the LNG stream (400) via heat exchanger (404) and heated by the stream (35) diverted from the output of the power island (330) via evaporator (320). Said diverted stream (35) is cooled by the heat transfer fluid of the second separate closed single loop (403) and also by the cold thermal energy embedded in the cryogen, to be subsequently compressed by a power recovery compressor (34) and re-injected into the power island (330), that may adopt any of the configurations depicted in FIG. 6A-6F, each of which is also an embodiment of the present invention.

The turbo-expander of the power recovery unit may preferably display four expansion stages as depicted in FIGS. 6A, 6B, 6E and 6F.

The turbo-expander of the power recovery unit may display five expansion stages as depicted in FIGS. 6C and 6D.

For each of the configurations 6A-6F, all embodiments of the present invention, the stream (35) diverted from the output of the power island (330) is cooled via the evaporator (32) then recompressed by a power recovery compressor (34) and injected back to the power island (330) downstream of the second-to-last expansion stage and upstream of the last power recovery heater and the last expansion stage. The work input of the compressor (34) is reduced by having its input cooled via evaporator (32) by the heat transfer fluid of the second separate closed single loop (403) and the pressurised cryogen, and the work output of the last expansion stage is increased by augmenting the mass flow rate processed by the last expansion stage. The rest of the output stream of the power island may be exhausted to the atmosphere or may be used to regenerate the adsorption vessels of the APU (13).

The power island may adopt any one of the configurations depicted in FIG. 6A-6F, each of which is also an embodiment of the present invention. One difference between FIGS. 5A and 6A, FIGS. 5B and 6B, FIGS. 5C and 6C, FIGS. 5D and 6D, FIGS. 5E and 6E, and FIGS. 5F and 6F is the presence of a stream (35) diverted from the output of the power island in FIG. 6A-6F, which is then cooled via evaporator (32) and recompressed by a compressor (34) and is injected back to the power island (600) downstream of the second-to-last expansion stage and upstream of the last power recovery heater (84, 850, 8400) and the last expansion stage (64, 650, 6400). FIGS. 6B, 6D and 6F displays the extra power recovery heater (80, 800, 8000). The extra power recovery heater (80, 800, 8000) may be placed upstream of the power recovery heater (81, 810, 8100) and upstream of the first expansion stage (61, 610, 6100), wherein the working fluid of the power recovery unit may be heated by the output of the last expansion stage (64, 650, 6400) prior to be heated further by the power recovery heater (81, 810, 8100) placed upstream of the first expansion stage.

The extra power recovery heater (80, 800, 8000) may be placed downstream of the evaporator (32).

What follows is common to the first, second and third embodiments of the present invention depicted in FIG. 4A-4C and also to the other embodiments of the invention depicted in FIG. 5A-5F and FIG. 6A-6F.

The cold box (17) is an assembly of heat exchangers, pipes and pressure vessels contained inside a metal structure filled with high quality insulation material, such as perlite. The cold box may encompass at least one single multi-pass heat exchanger. The cold box displays a warm side (upper side) and a cold side (lower side).

The main air compressor (10) may have at least one compression stage, preferably two compression stages, more preferably four compression stages. There may be a heat-of-compression capture heat exchanger downstream of at least one compression stage of the main air compressor, preferably downstream of its last compression stage. The task of a heat-of-compression capture heat exchanger is to capture at least part of the heat of compression generated by a compressor or a set of compression stages or a compression stage. There may be a cooler downstream of at least one compression stage. There may be a cooler downstream of at least one heat-of-compression capture heat exchanger. Typically, coolers (i.e. heat exchangers using air or water) are placed either upstream of the compression stages of a compressor to pre-cool the stream of gas prior to its compression through them (reduction of the compression work) or downstream of the compressor output to cool it down and ease its subsequent liquefaction. Preferably, there may be no cooling/heating during compression and in between the compression stages of the main air compressor i.e. the main air compressor may be adiabatic.

The recycle air compressor (14) may have preferably one compression stage, or at least one compression stage, or more preferably four compression stages. There may be a heat-of-compression capture heat exchanger downstream of at least one compression stage of the recycle air compressor, preferably downstream of its last compression stage. There may be a cooler downstream of at least one compression stage. There may be a cooler downstream of at least one heat-of-compression capture heat exchanger. Preferably, there may be no cooling/heating during compression and in between the compression stages of the recycle air compressor i.e. the recycle air compressor may be adiabatic.

With respect to the main air compressor and to the recycle air compressor, the amount of heat-of-compression capture heat exchangers and coolers and their respective locations relatively to the compression stage of the main air compressor and the recycle air compressor depend on the main air compressor—and the recycle air compressor-output temperature targets and on the parasitic losses they introduce (e.g. pressure drop, etc.), which increases the power consumption while affecting the grade of the heat of compression generated by the main air compressor and the recycle air compressor.

The power recovery unit of the CES system may comprise at least one turbo-expander, preferably one turbo-expander. Each turbo-expander may in turn comprise at least one expansion stage, preferably four or five expansion stages. There may be a power recovery heater upstream of each expansion stage.

The heat-of-compression recycle device may comprise a second separate closed double loop (11, 12, 12A) and a third separate closed double loop (15, 16, 16A). The advantage of having separate closed double loops (due to the occurrence of indirect heat exchange from a compressor to a TESD and from a TESD to a turbo-expander) lies in the ease of replenishing the heat transfer fluid in case of leakage and to control the pressure of the heat transfer fluid circulating through the separate closed double loops.

The second separate closed double loop may comprise the main air compressor-related TESD (12). Each single loop of the second separate closed double loop possesses a heat transfer fluid, a circulation pump and an arrangement of conduits that goes through the main air compressor-related TESD. Part of their respective arrangements of conduits that go through the main air compressor-related TESD may be shared, which supposes the presence of three-way valves and of a single heat transfer fluid.

One single loop of the second separate closed double loop captures at least some of the heat of compression generated by the main air compressor (10) using at least one heat-of-compression capturing heat exchanger (11) placed downstream of the main air compressor, and stores it in the main air compressor-related TESD (12). The other single loop (12A) of the second separate closed double loop provides hot thermal energy to the working fluid of the power recovery unit via at least one power recovery heater (84, 840, 850, 8100), prior to its expansion via at least one of the expansion stage (64, 640, 650, 6100) of the power recovery turbo-expander, as shown on FIG. 5A-5F and FIG. 6A-6F, which are also embodiments of the present invention. Said single loop may comprise at least one valve (e.g. three-way valve).

The main air compressor-related TESD (12) is thermally coupled to the main air compressor (10) via the heat-of-compression capturing heat exchanger (11).

The main air compressor-related TESD (12) may be a packed bed TESD, a stationary liquid phase-based TESD or a two-reservoirs TESD or preferably a thermocline TESD.

If the main air compressor-related TESD (12) is a packed bed TESD, the packed bed matrix may comprise particles randomly stacked on each other made of sensible matter (e.g. pebbles) or made of latent-heat phase change matter, or of combination thereof. If the main air compressor-related TESD is a packed bed TESD, the packed bed matrix may comprise particles non-randomly stacked on each other made of sensible matter (e.g. metal oxide beads) or made of latent-heat phase change matter, or of combination thereof. If the main air compressor-related TESD is a packed bed TESD, the packed bed matrix may comprise fused particles (e.g. ceramics).

The main air compressor-related TESD may store heat of compression whose temperature is between 20° and 400° C. The heat transfer fluid circulating through the second separate closed double loop may be a gas or a liquid. Said heat transfer fluid may comprise water or a mixture of water and glycol, or thermal oil or a mixture of thermal oils (synthetic oils, natural oils, mineral oils) or molten salts.

The third separate closed double loop may comprise the recycle air compressor-related TESD (16). Each single loop of the third separate closed double loop possesses a heat transfer fluid, a circulation pump and an arrangement of conduits that goes through the recycle air compressor-related TESD. Part of their respective arrangements of conduits that go through the recycle air compressor-related TESD may be shared, which supposes the presence of three-way valves and of a single heat transfer fluid.

One single loop of the third separate closed double loop captures at least some of the heat of compression generated by the recycle air compressor (14) using at least one heat-of-compression capturing heat exchanger (15) placed downstream of the recycle air compressor, and stores it in the recycle air compressor-related TESD (16). The other single loop (16A) of the third separate closed double loop provides hot thermal energy to the working fluid of the power recovery unit via at least one power recovery heater (81, 82, 83, 810, 820, 830, 8200, 8300, 8400) prior to its expansion via at least one of the expansion stage (61, 62, 63, 610, 620, 630, 6200, 6300, 6400) of the power recovery turbo-expander, as shown on FIG. 5A-5F and FIG. 6A-6F, which are also embodiments of the present invention. Said single loop may comprise at least one valve (e.g. three-way valve).

The recycle air compressor-related TESD (16) is thermally coupled to the recycle air compressor (14) via the heat-of-compression capturing heat exchanger (15).

The recycle air compressor-related TESD may be a packed bed TESD, a stationary liquid phase-based TESD or a two-reservoirs TESD or preferably a thermocline TESD.

If the recycle air compressor-related TESD (16) is a packed bed TESD, the packed bed matrix may comprise particles randomly stacked on each other made of sensible matter (e.g. pebbles) or made of latent-heat phase change matter, or of combination thereof. If the recycle air compressor-related TESD is a packed bed TESD, the packed bed matrix may comprise particles non-randomly stacked on each other made of sensible matter (e.g. metal oxide beads) or made of latent-heat phase change matter, or of combination thereof. If the recycle air compressor-related TESD is a packed bed TESD, the packed bed matrix may comprise fused particles (e.g. ceramics).

The recycle air compressor-related TESD (16) may store heat of compression whose temperature is between 15° and 350° C. The heat transfer fluid circulating through the third separate closed double loop may be a gas or a liquid. Said heat transfer fluid may comprise water or a mixture of water and glycol, or thermal oil or a mixture of thermal oils (synthetic oils, natural oils, mineral oils) or molten salts.

The gas to be liquefied by the liquefaction unit of the CES system may be ambient air, nitrogen gas or any air whose concentrations in oxygen and nitrogen differ to those in ambient air. The cryogen produced by the liquefaction unit, subsequently filling the cryogen tank and processed by the power recovery unit may be liquid air, liquid nitrogen or any liquid air whose concentrations in oxygen and nitrogen differ to those from the ambient air.

The hot thermal energy provided to the working fluid of the power recovery unit via at least one power recovery heater may stem from the heat-of-compression recycle device through the second (11, 12, 12A) and third (15, 16, 16A) separate closed double loops.

Figure 7A:
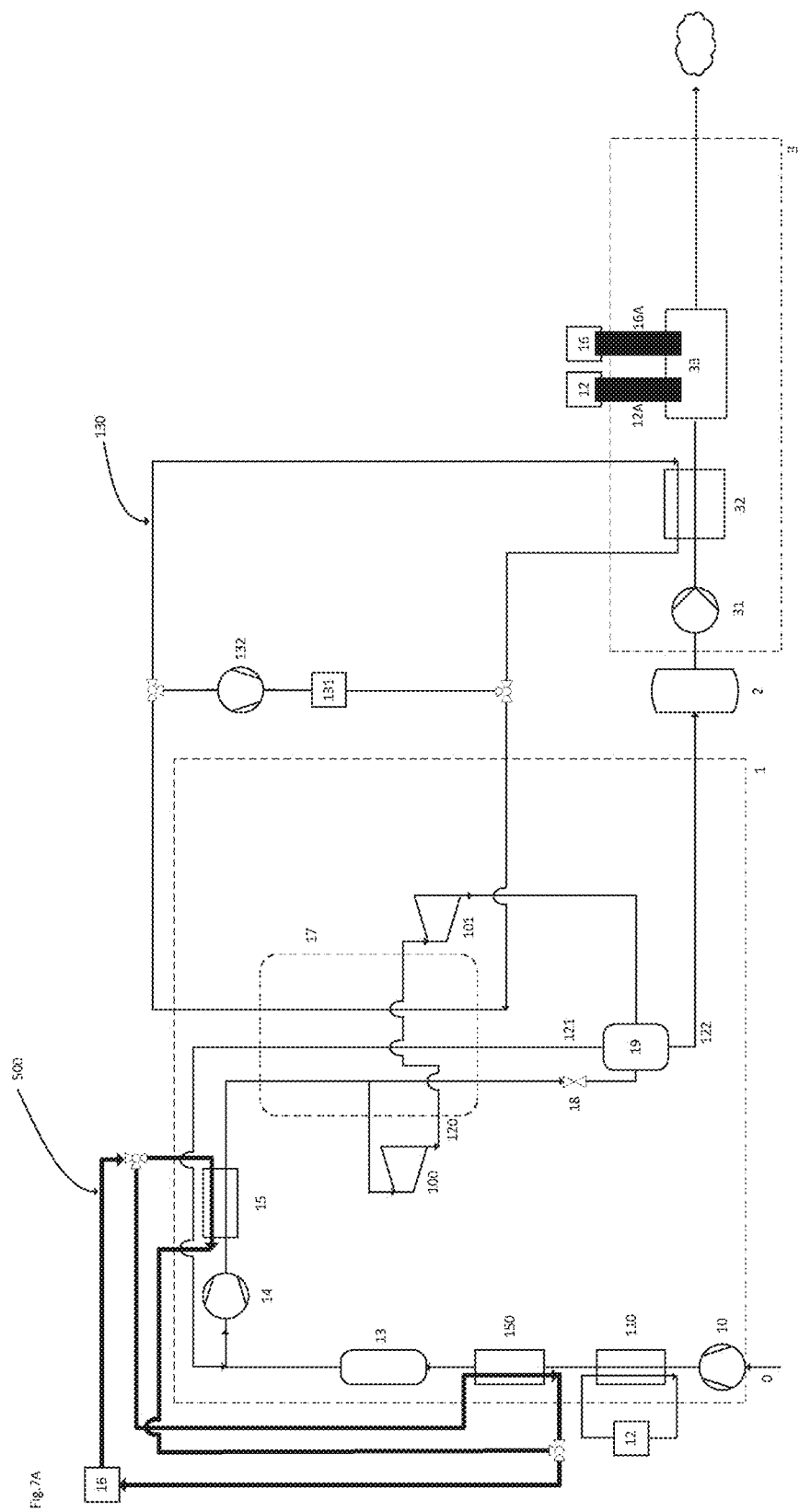
FIGS. 7A, 7B and 7C show embodiments of cryogenic energy storage systems similar to the systems shown in FIGS. 4A, 4B, and 4C, respectively.
Figure 7B:
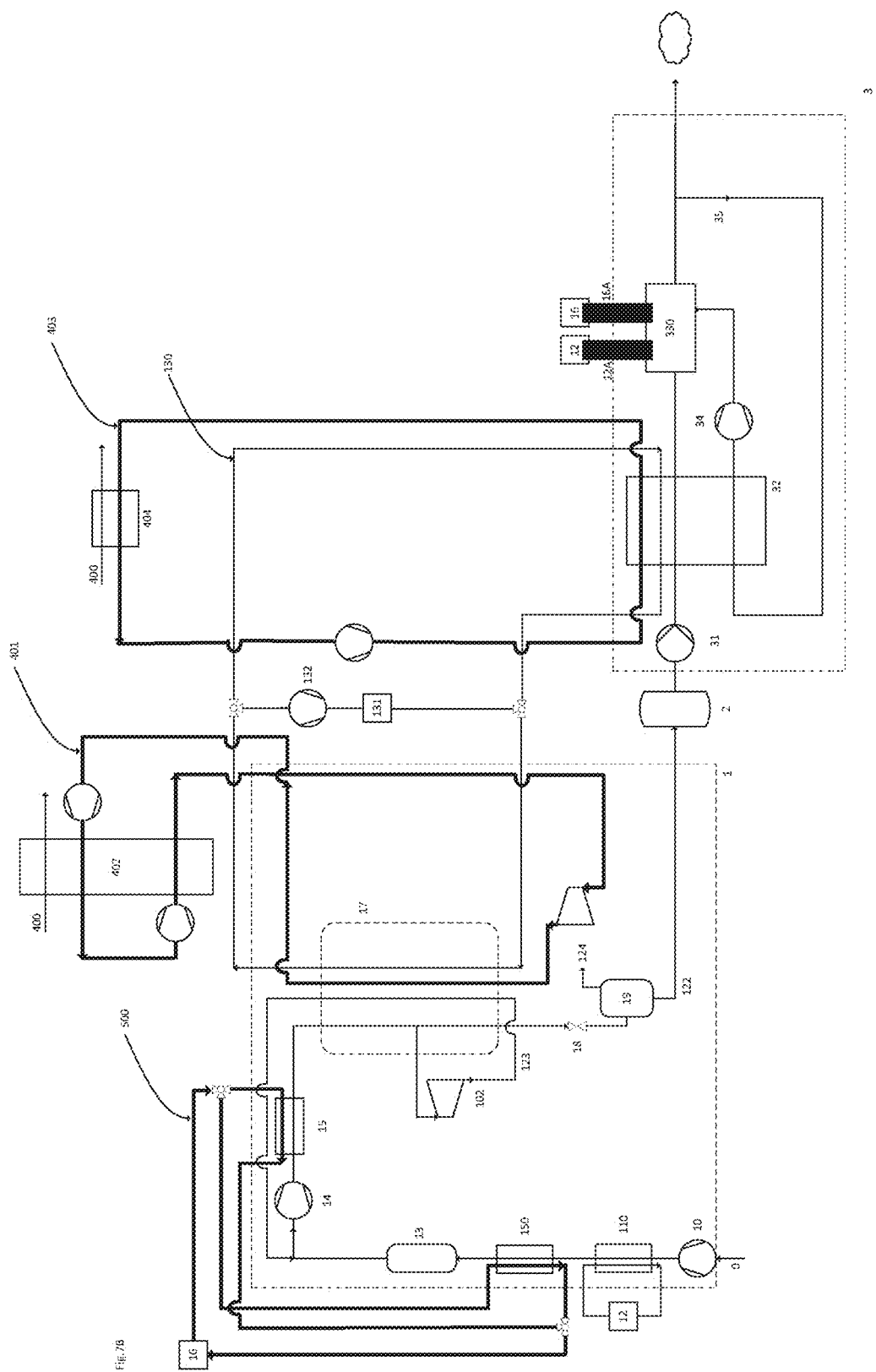
Figure 7C:
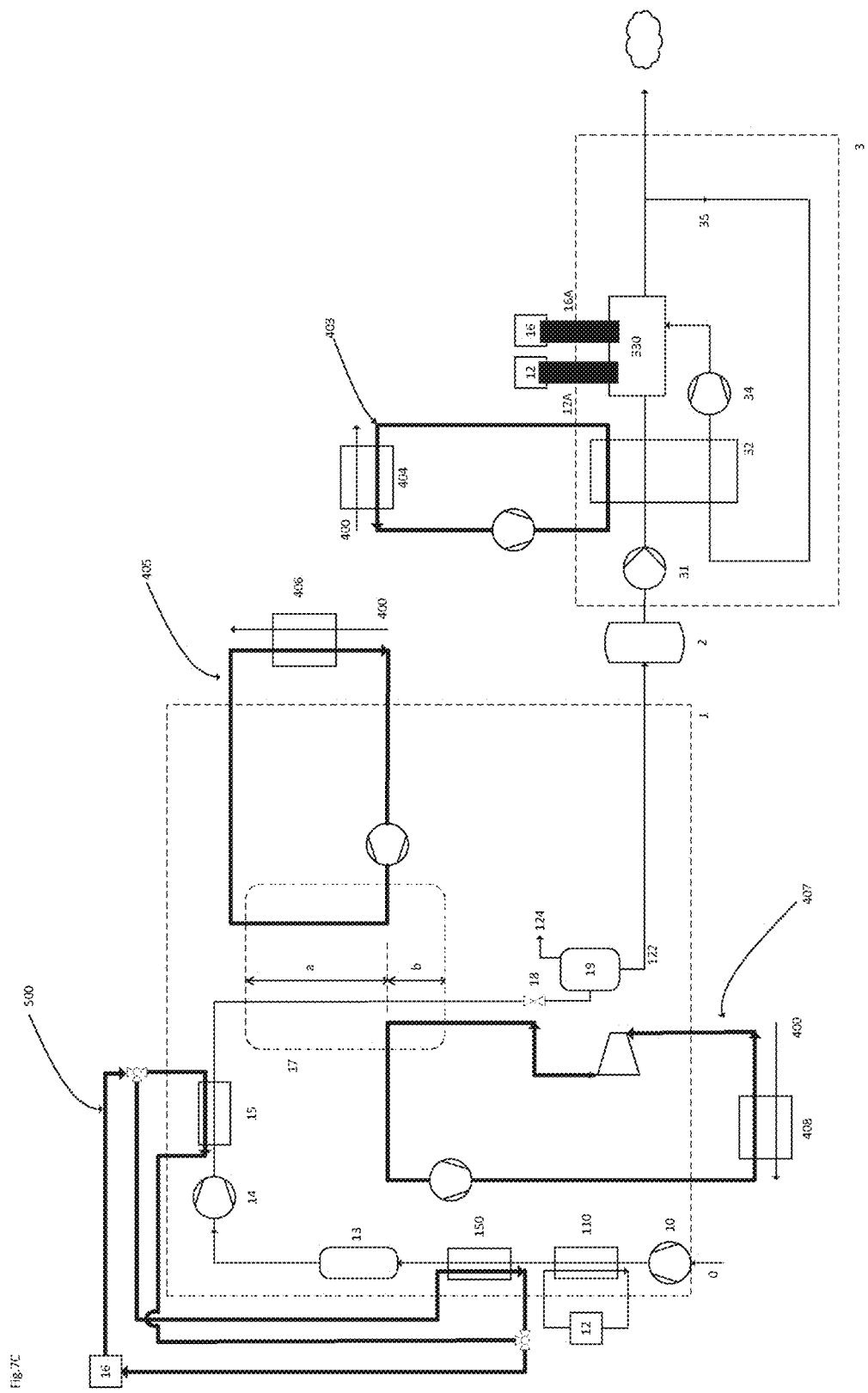

FIGS. 7A, 7B and 7C show cryogenic energy storage systems similar to the systems shown in FIGS. 4A, 4B, and 4C, respectively. The differences between the systems of FIG. 7 and FIG. 4 are as follows:

- The first heat of compression-capturing heat exchanger (11) depicted in FIGS. 4A-4C is split into a third heat-of-compression-capturing heat exchanger (110) and a fourth heat-of-compression-capturing heat exchanger (150).
- The third (110) and fourth (150) heat of compression-capturing heat exchangers are both thermally coupled to the main air compressor (10). In other words, the third (110) and fourth (150) heat of compression-capturing heat exchangers each capture heat of compression from the main air compressor (10).
- The third heat of compression-capturing heat exchanger (110) is thermally coupled to the second thermal energy storage device (or main air compressor-related TESD) (12);
- The fourth heat of compression-capturing heat exchanger (150) is thermally coupled to the first thermal energy storage device (or recycle air compressor-related TESD) (16);
- The second (11, 12, 12A) and third (15, 16, 16A) separate closed double loops depicted in FIGS. 4A, 4B and 4C are now replaced by the fourth (110, 12, 12A) and the fifth (500; 16, 16A) separate closed double loops depicted in FIGS. 7A, 7B and 7C.

The fourth separate closed double loop (110, 12, 12A) has two single loops (110, 12) and (12A): a heat transfer fluid circulates through the single loop (110, 12) and may capture a portion of the heat of compression from the main air compressor (10) via the heat of compression-capturing heat exchanger (110). The temperature of the heat of compression stored in the second thermal energy storage device (12) may be between 150° C. and 550° C. The heat of compression is transferred from the heat exchanger (110) by the heat transfer fluid and stored in the second thermal energy storage device (12). A further heat transfer fluid circulating through the single loop (12A) conveys at least some of the stored heat of compression to the power recovery heater (85000) to heat the working fluid of the power recovery unit (3) as shown in FIGS. 8A-8B and 9A-9B.

The fifth separate closed double loop (500; 16, 16A) has two single loops (500) and (16A): a heat transfer fluid circulates through the single loop (500) and may capture a portion of the heat of compression from the main air compressor (10) via the heat of compression-capturing heat exchanger (150), and a portion of the heat of compression from the recycle air compressor (14) via the second heat of compression-capturing heat exchanger (15). The temperature of the heat of compression stored in the first thermal energy storage device (16) may be between 150° C. and 350° C. The portion of heat of compression from the main air compressor captured by the heat of compression-capturing heat exchanger (150) and the portion of heat of compression from the recycle air compressor captured by the heat of compression-capturing heat exchanger (15) may be at the same temperature and they each are stored in the first thermal energy storage device (16). A further heat transfer fluid circulating through the single loop (16A) conveys at least some of the stored heat of compression to the power recovery heaters (81000; 82000; 83000; 84000) to heat the working fluid of the power recovery unit (3) as shown in FIGS. 8A-8B and 9A-9B. The power recovery heater (85000) is located downstream of the power recovery heater (84000) and upstream of the fourth expansion stage (64000).

The temperature of the heat of compression stored in the second thermal energy storage device (12) is higher than the temperature of the heat of compression stored in the first thermal energy storage device (16).

The turbo-expander of the power recovery unit (3) may preferably display four expansion stages.

Figure 8A:
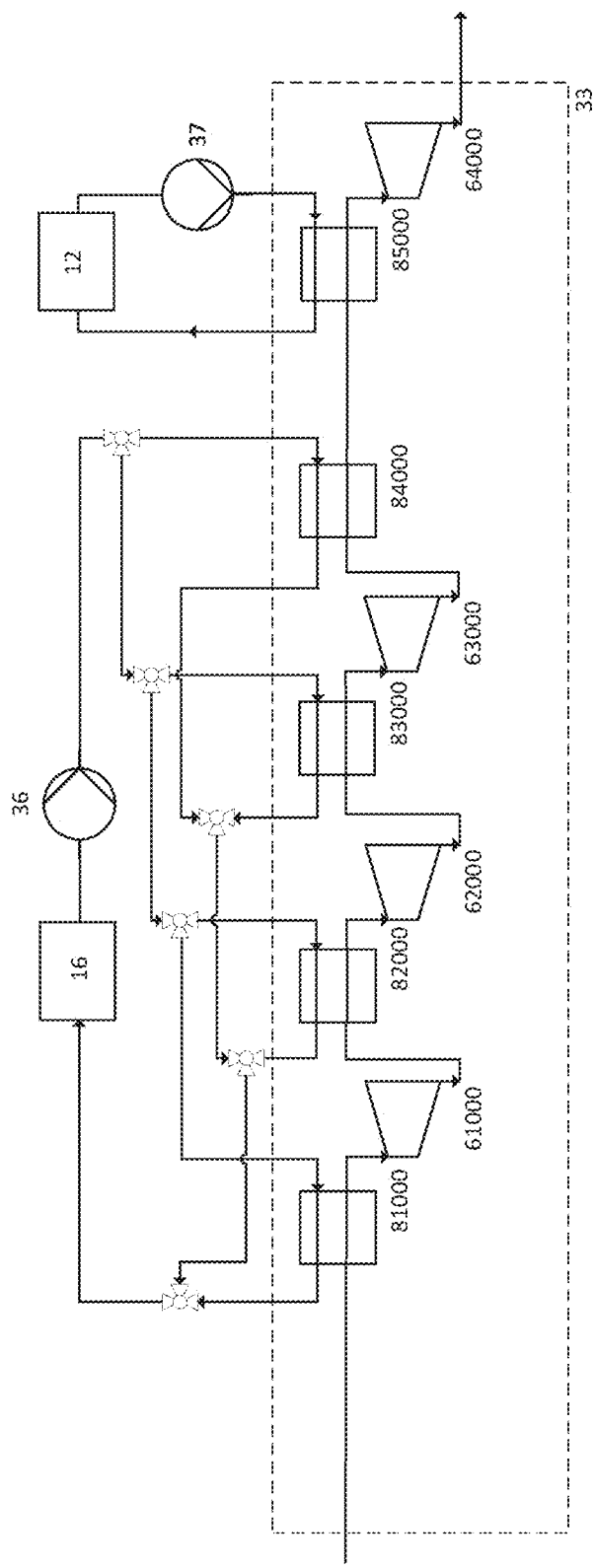
FIGS. 8A and 8B represent two further alternative embodiments of the power island (33) for a standalone CES system as shown in FIG. 7A.
Figure 8B:
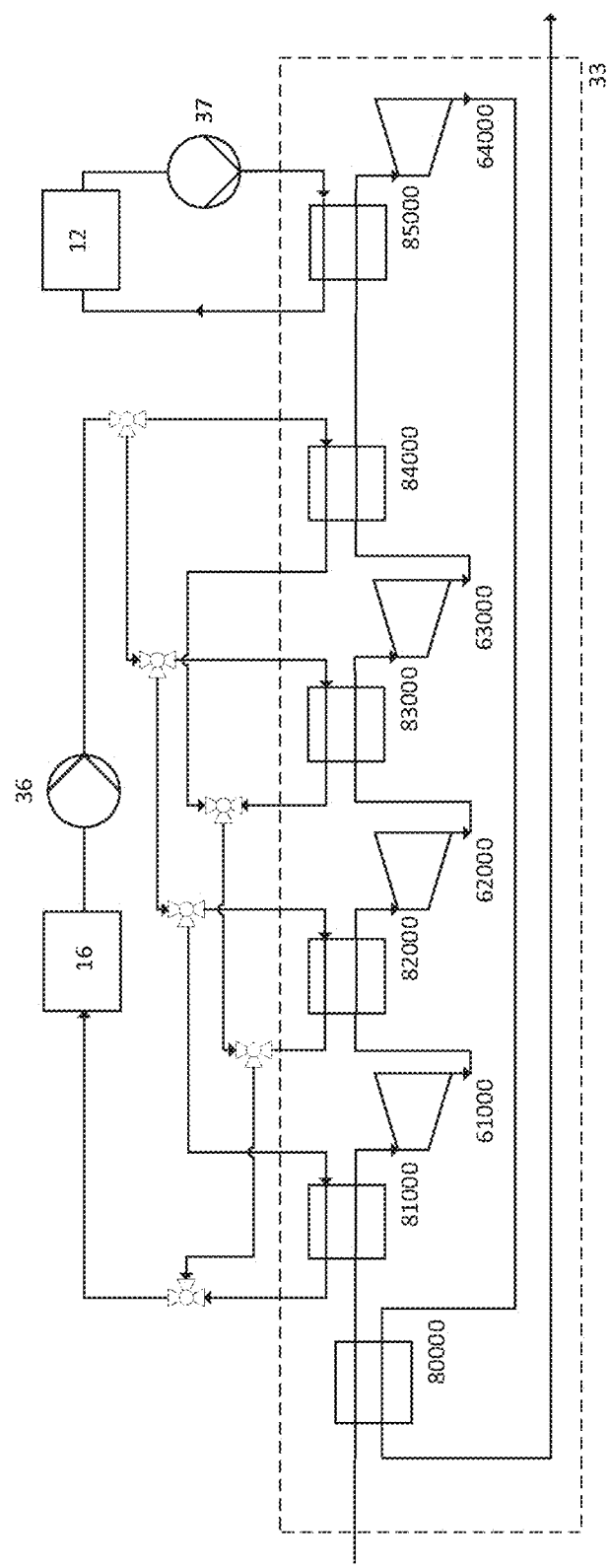

FIGS. 8A and 8B represent two further alternatives of the power island (33) for a standalone CES system as shown in FIG. 7A, which are embodiments of the present invention.

Figure 9A:
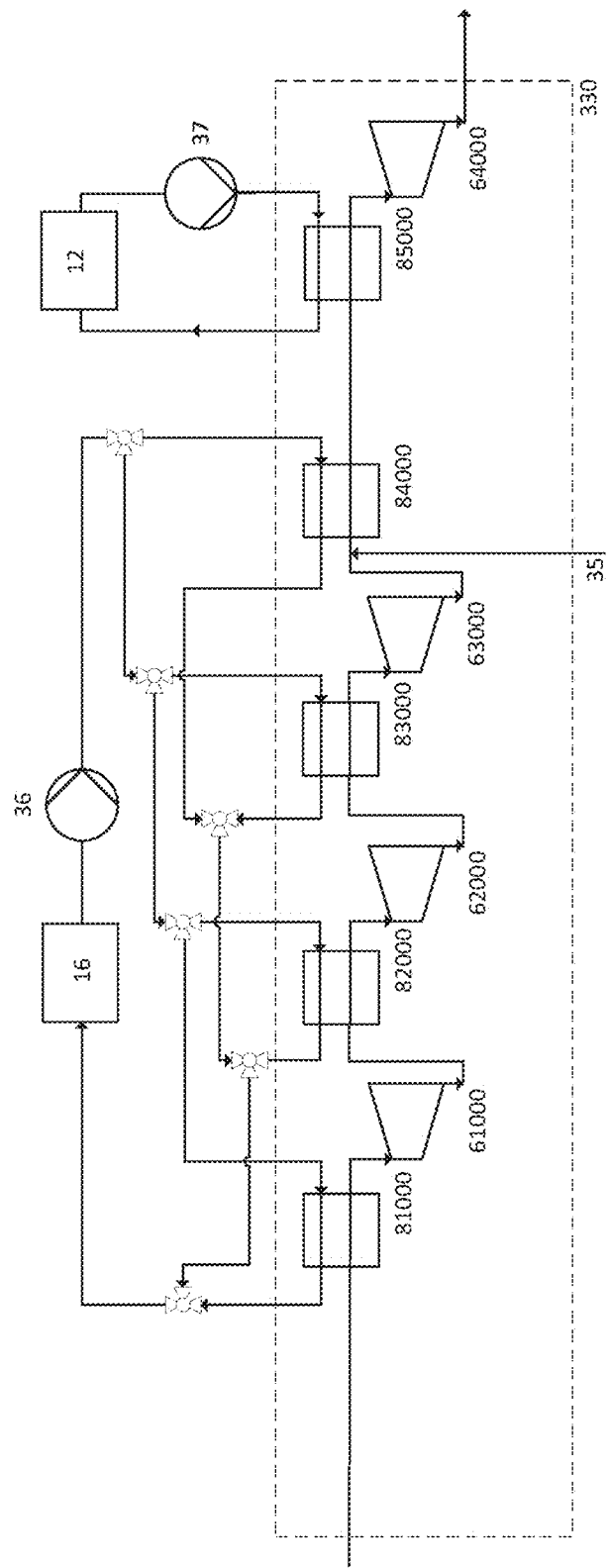
FIGS. 9A and 9B represent a further two alternative arrangements of the power island (330) for a thermally-integrated CES system as shown in FIGS. 7B and 7C, which are embodiments of the present invention.
Figure 9B:
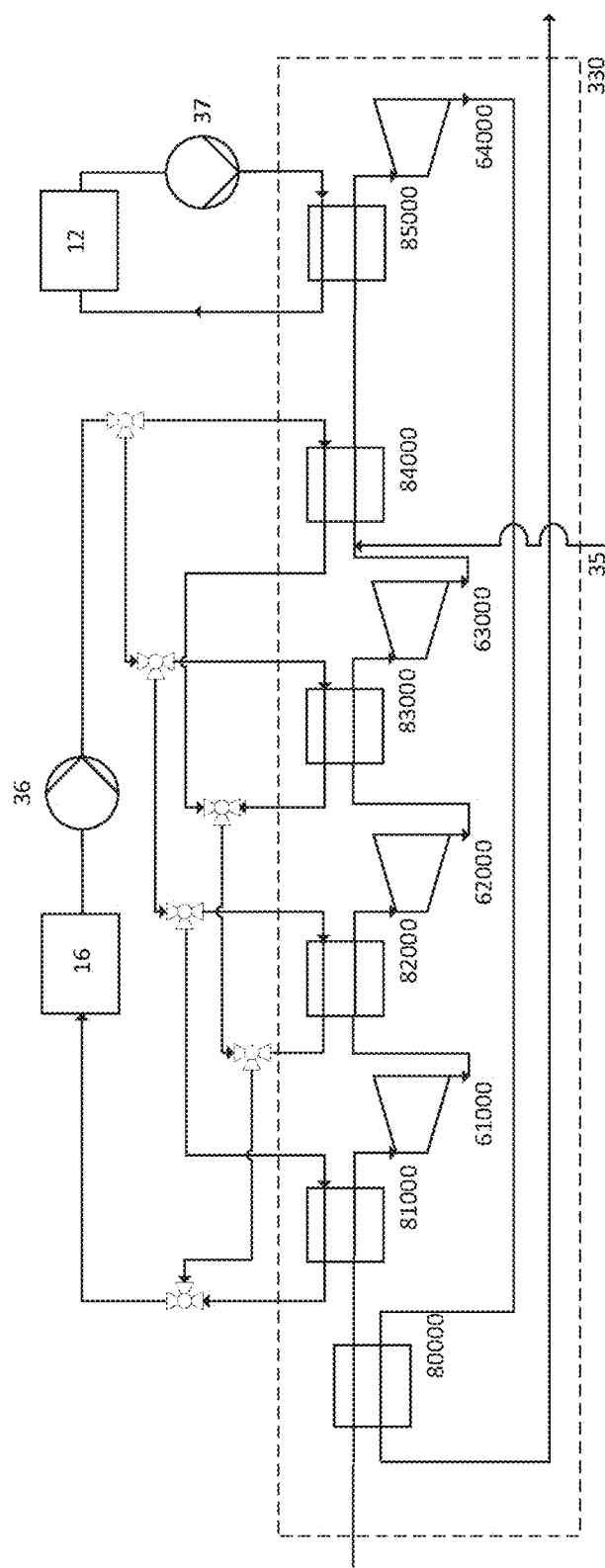

FIGS. 9A and 9B represent a further two alternative arrangements of the power island (330) for a thermally-integrated CES system as shown in FIGS. 7B and 7C, which are embodiments of the present invention.

Figure 10:
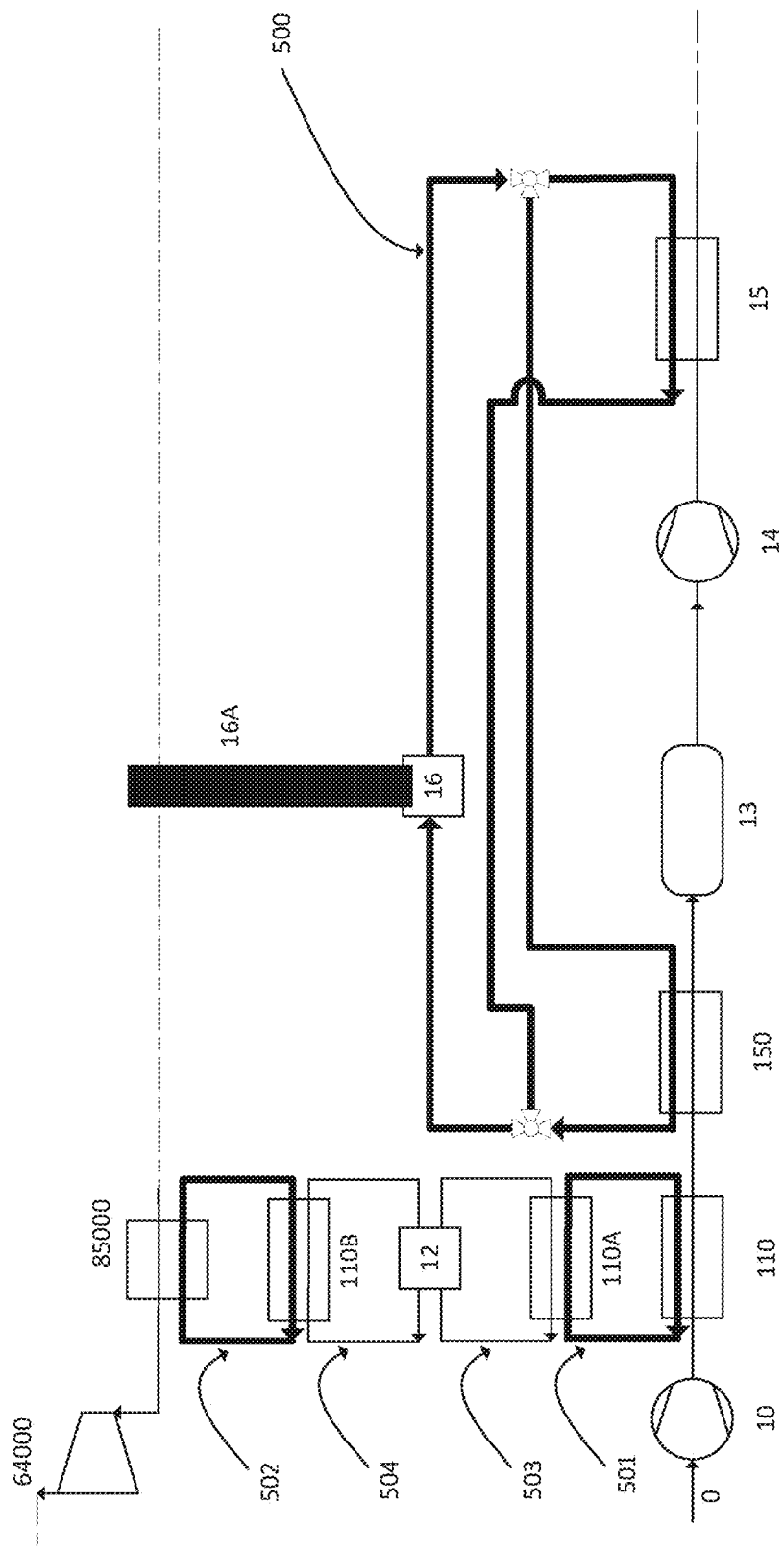
FIG. 10 depicts an embodiment of a CES system according to the present invention and shows first (501) and second (502) intermediate closed loops.

FIG. 10 depicts an alternative view of a CES system according to the present invention. FIG. 10 shows an arrangement of a first (501) and a second (502) intermediate closed loop. FIG. 10 provides an alternative view of the embodiments of the present invention as shown in FIGS. 7A-7C, 8A-8B, 9A-9B when the first (501) and the second (502) intermediate closed loops are introduced.

FIGS. 7 to 10 depict power recovery sub-systems and cryogenic energy storage systems which are embodiments of the claimed invention, and are further embodied by the numbered clauses of the invention.

The first thermal energy storage device (16) may supply hot thermal energy to the working fluid of the power recovery prior to each of the four expansion stages (61000, 62000, 63000, 64000) via power recovery heaters (81000, 82000, 83000, 84000) while the second thermal energy storage device (12) may supply hot thermal energy to the working fluid of the power recovery unit prior to the last fourth expansion stage (64000) via the power recovery heater (85000) placed downstream of the power recovery heater (84000) and upstream of the last expansion stage (64000) (See FIG. 8A). An extra power recovery heater (80000) may be placed upstream of the power recovery heater (81000) upstream of the first expansion stage (61000), wherein the working fluid of the power recovery unit may be heated by the output of the fourth expansion stage (64000) prior to being heated further by the power recovery heater (81000) placed upstream of the first expansion stage (See FIG. 8B). After having transferred its hot thermal energy to the working fluid of the power recovery unit via the extra power recovery heater (80000), the output of the fourth expansion stage may be discharged into the atmosphere or used to regenerate the adsorption vessels of the APU.

For each of the configurations 9A-9B, which are embodiments of the present invention, the stream (35) diverted from the output of the power island (330) is cooled via the evaporator (32) then recompressed by a power recovery compressor (34) and injected back to the power island (330) downstream of the penultimate expansion stage and upstream of the power recovery heaters (84000, 85000) and the last expansion stage (64000). The work input of the compressor (34) is reduced by having its input cooled via evaporator (32) by the heat transfer fluid of the second separate closed single loop (403) and the work output of the last expansion stage is increased by augmenting the mass flow rate processed by the last expansion stage. The rest of the output stream of the power island may be exhausted to the atmosphere or used to regenerate the adsorption vessels of the APU (13).

One difference between FIGS. 8A and 9A and FIGS. 8B and 9B, is the presence of a stream (35). In FIGS. 9A and 9B, at least a portion of the output from the power island (330) downstream of the last expansion stage (64000) is diverted, cooled via evaporator (32), and recompressed by a compressor (34), before being injected back to the power island (330) downstream of the penultimate expansion stage (63000) and upstream of the power recovery heaters (84000, 85000) and the last expansion stage (64000). FIG. 9B displays the extra power recovery heater (80000). The extra power recovery heater (80000) may be placed upstream of the power recovery heater (81000) and upstream of the first expansion stage (61000), wherein the working fluid of the power recovery unit may be heated by the output of the last expansion stage (64000) prior to be heated further by the power recovery heater (81000) placed upstream of the first expansion stage (61000).

In FIGS. 7A-7C, 8A-8B, 9A-9B and 10, the first thermal energy storage device (16) is thermally coupled to the recycle air compressor (14) via the heat of compression-capturing heat exchanger (15) and to the main air compressor (10) via the heat of compression-capturing heat exchanger (150). The heat transfer fluids circulating through the two single loops of the fifth separate closed double loop (500; 16, 16A) may contain only water or may contain a mixture of water and glycol. The first thermal energy storage device (16) may store heat of compression at a temperature between 150° C. and 350° C.

In FIGS. 7A-7C, 8A-8B, 9A-9B and 10, the second thermal energy storage device (12) is thermally coupled to the main air compressor (10) via the heat of compression-capturing heat exchanger (110). The heat transfer fluids circulating the two single loops of through the fourth separate closed double loop (110, 12, 12A) may contain molten salts. The second thermal energy storage device (12) may store heat of compression at a temperature between 150° C. and 550° C., preferably between 200° C. and 400° C.

The advantage of providing both a third (110) and a fourth (150) heat of compression-capturing heat exchanger, as in FIGS. 7A-7C and 10, is to ensure that the process stream remains hot enough while passing through the third (110) heat of compression-capturing heat exchanger so as to avoid the molten salts circulating in the single loop (110, 12) freezing.

The advantage of providing the two power recovery heaters (84000; 85000) in FIGS. 8A-8B and 9A-9B is to heat the working fluid enough while passing through the power recovery heater (84000) so as to avoid the molten salts circulating through the single loop 12A of the fourth separate closed double loop (110, 12, 12A) freezing while passing through the power recovery heater (85000).

Molten salts may be advantageously used as a heat transfer fluid in the fourth separate closed double loop. Using molten salts as heat transfer fluids may provide the following advantages:
- they have an ultra-low vapour pressure (approximately 0 kPa) i.e. they can be maintained in a liquid state by pressurising them moderately and thus only require the use of a low-pressure vessel (e.g. pressurised to, for example, a few hundred millibars, which is inexpensive) to store them;
- they need less energy to be pressurised via a pump than gaseous heat transfer fluids via a compressor;
- they have a high density, typically, for example, between 1600 and 2500 kg/m$^3$;
- they are stable at high temperatures;
- they are not flammable;
- they have a low viscosity at high temperatures;
- they have a high heat capacity per unit volume;
- they are used in a wide range of applications, from energy storage to nuclear reactors and concentrating solar power (CSP) plants.

However, conveying molten salts through pipework requires the use of a bespoke and expensive type of pipework which is able to maintain the temperature of the molten salts above the temperature at which they solidify or 'freeze' through the use of heat tracing. Without this type of pipework, the molten salts within the pipework between the main air compressor (10) and the power recovery heater (85000) may freeze, causing operation and maintenance issues in the overall system. In addition, molten salts are corrosive and may damage pipework and expensive mechanical equipment within the CES system.

An example of the type of pipework required for transporting molten salts is described in U.S. Pat. No. 8,895,901 B2 to BASF. Molten salt pipework differs from traditional pipework, such that conventional pipework may not be suitable for transporting molten salts. For example, molten salt pipework may maintain the salts above freezing point in order to avoid the process of re-melting. In another example, molten salt pipework may contain a circulation pump specifically designed for pumping molten salt.

The second thermal energy storage device may be specifically configured to store thermal energy, or heat, at a higher grade than that stored by the first thermal energy storage device. This may include being configured to contain the bespoke pipework required for molten salts, detailed above.

A first intermediate closed loop (501) and a second intermediate closed loop (502) may be incorporated in the present invention as depicted in FIG. 10 to solve the problems with molten salts mentioned above. In other words, the first and second intermediate closed loops reduce the amount of required heat tracing-equipped pipework, thereby decreasing the capital expenditure and keeping apart the pipework conveying the molten salts and the pipework conveying the process stream of the liquefaction unit and the working fluid of the power recovery unit.

A first intermediate closed loop (501) may be introduced in between the main air compressor (10) and one single loop (110, 12) of the fourth separate closed double loop (110, 12, 12A). In this case, the fourth separate closed double loop (110, 12, 12A) becomes the sixth separate closed double loop (503, 12, 504). The first intermediate closed loop (501) goes through the heat of compression-capturing heat exchanger (110) and an additional heat exchanger (110A) that allows for thermal transfer between the heat of compression capturing heat exchanger (110) and the single loop (503) of the sixth separate closed double loop (503, 12, 504).

A second intermediate closed loop (502) may be introduced in between the single loop (504) of the fourth separate closed double loop (110, 12, 12A) and the power recovery heater (85000). In this case, the fourth separate closed double loop (110, 12, 12A) becomes the sixth separate closed double loop (503, 12, 504). The second intermediate closed loop (502) goes through the heat exchanger (110B) and the power recovery heater (85000). An additional heat exchanger (110B) allows for thermal transfer between the single loop (504) of the sixth separate closed double loop (503, 12, 504) and the power recovery heater (85000).

Each of the first (501) and second (502) intermediate closed loops may comprise:
- a heat transfer fluid;
- a pump (if the heat transfer fluid is a liquid) or a mechanical blower (if the heat transfer fluid is a gas) to circulate the heat transfer fluid through said intermediate closed loops;
- a pressurisation unit that accommodates the change in volume occupied by the heat transfer fluid in the intermediate closed loops induced by the thermal variations imposed to said heat transfer fluid.

The heat transfer fluid in the intermediate closed loops may be a single type of thermal oil or a mixture of thermal oils. Examples of thermal oils that could be used are fluids from the DowTherm™ range of heat transfer fluids and the SylTherm™ range of silicone fluids, both manufactured by The Dow Chemical Company. Other suitable fluids may also be used.

The mechanical blower or the pump is used to offset the pressure drop that affects said heat transfer fluid when circulating through the first (501) and the second (502) intermediate closed loops.

The first (501) and second (502) intermediate closed loops thus maintain the molten salts above the temperature at which they 'freeze' to avoid their solidification, which would otherwise cause operation and maintenance issues in the pipework between the main air compressor (10) and the power recovery heater (85000), as well as the overall system. Also, the first (501) and second (502) intermediate closed loops keep the molten salts away from the pipework conveying the process stream of the liquefaction unit and the working fluid of the power recovery unit.

The invention claimed is:

1. A power recovery sub-system for a cryogenic energy storage system, the power recovery sub-system comprising:
   a primary thermal energy storage device;
   a secondary thermal energy storage device;
   a first primary heat exchanger;
   a second primary heat exchanger;
   a first primary expansion stage;
   a second primary expansion stage;
   a first secondary heat exchanger;
   a first secondary expansion stage;
   a first arrangement of conduits, having an upstream end and a downstream end, and configured to pass a working fluid through the first primary heat exchanger, the first primary expansion stage, the second primary heat exchanger, and the second primary expansion stage;
   a second arrangement of conduits configured to pass a first heat transfer fluid from the primary thermal energy storage device, through the first primary heat exchanger and the second primary heat exchanger; and
   a third arrangement of conduits configured to pass a second heat transfer fluid from the secondary thermal energy storage device, through the first secondary heat exchanger,
   wherein the second arrangement of conduits is further configured to pass a first portion of the first heat transfer fluid through the first primary heat exchanger and pass a second portion of the first heat transfer fluid through the second primary heat exchanger; and
   wherein the first arrangement of conduits is further configured to pass the working fluid through the first secondary heat exchanger and the first secondary expansion stage;
   wherein the secondary thermal energy storage device is configured to store thermal energy at a higher grade than that stored by the primary thermal energy storage device.

2. The sub-system of claim 1, further comprising:
   a third primary heat exchanger; and
   a third primary expansion stage;
   wherein the first arrangement of conduits is further configured to pass the working fluid through the third primary heat exchanger and the third primary expansion stage; and
   wherein the second arrangement of conduits is further configured to pass a third portion of the first heat transfer fluid through the third primary heat exchanger.

3. The sub-system according to claim 1, further comprising:
   a second secondary heat exchanger; and
   a second secondary expansion stage;
   wherein the first arrangement of conduits is further configured to pass the working fluid through the second secondary heat exchanger and the second secondary expansion stage; and
   wherein the third arrangement of conduits is further configured to pass a first portion of the second heat transfer fluid through the first secondary heat exchanger and pass a second portion of the second heat transfer fluid through the second secondary heat exchanger.

4. The sub-system of claim 1, wherein the or each heat exchanger through which the third arrangement of conduits passes is positioned along the first arrangement of conduits upstream of the heat exchangers through which the second arrangement of conduits passes.

5. The sub-system of claim 1, wherein the or each heat exchanger through which the third arrangement of conduits passes is positioned along the first arrangement of conduits downstream of the heat exchangers through which the second arrangement of conduits passes.

6. The sub-system according to claim 1, further comprising:
   an extra heat exchanger,
   wherein the first arrangement of conduits is further configured to pass the working fluid through the extra heat exchanger upstream of both (i) the furthest upstream heat exchanger through which the second arrangement of conduits passes and (ii) the furthest upstream heat exchanger through which the third arrangement of conduits passes, and
   wherein the first arrangement of conduits is further configured to pass the working fluid output from the furthest downstream expansion stage through the extra heat exchanger to an exhaust.

7. The sub-system according to claim 1, further comprising:
   a fourth arrangement of conduits configured to divert a portion of the working fluid from a downstream position in the first arrangement of conduits through an evaporator and a first compressor, and return it to an upstream position in the first arrangement of conduits.

8. The sub-system according to claim 7, wherein the evaporator is positioned along the first arrangement of conduits upstream of the furthest upstream heat exchanger, wherein the downstream position is downstream of the furthest downstream expansion stage; and wherein the upstream position is immediately upstream of the furthest downstream expansion stage.

9. The sub-system according to claim 2, configured such that the second arrangement of conduits passes through the first primary heat exchanger, the second primary heat exchanger, and the third primary heat exchanger and the third arrangement of conduits passes through the first secondary heat exchanger, and wherein the heat exchanger through which the third arrangement of conduits passes is upstream of the heat exchangers through which the second arrangement of conduits passes.

10. The sub-system according to claim 3, configured such that the second arrangement of conduits passes through the first primary heat exchanger, the second primary heat exchanger, and the third primary heat exchanger and the third arrangement of conduits passes through the first secondary heat exchanger and the second secondary heat exchanger, wherein the heat exchangers through which the second arrangement of conduits passes are upstream of the heat exchangers through which the third arrangement of conduits passes.

11. The sub-system according to claim 1, configured such that the second arrangement of conduits passes through the first primary heat exchanger, the second primary heat exchanger, and the third primary heat exchanger and the third arrangement of conduits passes through the first secondary heat exchanger, wherein the heat exchangers through which the second arrangement of conduits passes are upstream of the heat exchanger through which the third arrangement of conduits passes.

12. The sub-system of claim 1, wherein the second arrangement of conduits is further configured to return the first heat transfer fluid to the primary thermal energy storage device after passing it through each heat exchanger through which the second arrangement of conduits is configured to pass, such that the second arrangement of conduits forms a first closed circuit.

13. The sub-system of claim 12, wherein the third arrangement of conduits is further configured to return the second heat transfer fluid to the secondary thermal energy storage device after passing it through each heat exchanger through which the third arrangement of conduits is configured to pass, such that the third arrangement of conduits forms a second closed circuit.

14. The sub-system of claim 13, wherein the primary thermal energy storage device is configured to store at least a portion of a heat of compression generated by a recycle air compressor and the secondary thermal energy storage device is configured to store at least a portion of a heat of compression generated by a main air compressor.

15. The sub-system of claim 1, further comprising:
a further primary heat exchanger; and
an intermediate heat exchanger, wherein:
the first arrangement of conduits is further configured to pass the working fluid through the further primary heat exchanger immediately upstream of the first secondary heat exchanger, and wherein;
the third arrangement of conduits is configured to form a first closed loop and a second closed loop, the first closed loop passing through the secondary thermal energy storage device and the intermediate heat exchanger, and the second closed loop passing through the intermediate heat exchanger and the first secondary heat exchanger.

16. The sub-system of claim 15, wherein the primary thermal energy storage device is configured to store at least a portion of a heat of compression generated by a main air compressor and at least a portion of the heat of compression generated by a recycle air compressor, and the secondary thermal energy storage device is configured to store and at least a portion of the heat of compression generated by the main air compressor.

17. The sub-system of claim 13, wherein the secondary thermal energy storage device is configured to store thermal energy at a higher temperature than the temperature of the thermal energy stored in the primary thermal energy storage device.

18. The power recovery sub-system of claim 1, disposed within a cryogenic energy storage system, the cryogenic energy storage system further comprising:
a liquefaction sub-system configured to supply thermal energy to the primary and secondary thermal energy storage devices, and further comprising;
a main air compressor;
a recycle air compressor;
a first heat-of-compression capturing heat exchanger;
a second heat-of-compression capturing heat exchanger;
a fifth arrangement of conduits configured to pass a process stream through the main air compressor, first heat-of-compression capturing heat exchanger, recycle air compressor, and second heat-of-compression capturing heat exchanger;
a sixth arrangement of conduits forming a third closed circuit and configured to pass a third heat transfer fluid between the secondary thermal energy storage device and the first heat-of-compression capturing heat exchanger; and
a seventh arrangement of conduits forming a fourth closed circuit and configured to pass a fourth heat transfer fluid between the primary thermal energy storage device and the second heat-of-compression capturing heat exchanger,
wherein the first heat-of-compression capturing heat exchanger is positioned along the fifth arrangement of conduits immediately downstream of the main air compressor and configured to transfer at least a portion of a heat of compression of the process stream from the main air compressor, via the third heat transfer fluid to the secondary thermal energy storage device, and
wherein the second heat-of-compression capturing heat exchanger is positioned along the fifth arrangement of conduits immediately downstream of the recycle air compressor and configured to transfer at least a portion of the heat of compression of the process stream from the recycle air compressor, via the fourth heat transfer fluid to the primary thermal energy storage device.

19. The power recovery sub-system of claim 1, disposed within a thermal energy recycle system, the thermal energy recycle system further comprising:
a main air compressor; and
a recycle air compressor;
wherein the system is configured to capture at least a portion of a heat of compression produced by the main air compressor and store it in the secondary thermal energy storage device during a liquefaction phase, and
wherein the system is further configured to capture at least a portion of the heat of compression produced by the recycle air compressor and store it in the primary thermal energy storage device during a liquefaction phase.

20. A method for recycling thermal energy in a cryogenic energy storage system including the power recovery sub-system of claim 1, the method comprising:
providing a liquefaction sub-system comprising:
a main air compressor;
a recycle air compressor;
providing the power recovery sub-system of claim 1;
capturing at least a portion of a heat of compression from the main air compressor and storing it in the secondary thermal energy storage device;
capturing at least a portion of the heat of compression from the recycle air compressor and storing it in the primary thermal energy storage device;
storing thermal energy in the secondary thermal energy storage device at a higher grade than in the primary thermal energy storage device;
passing the working fluid along the first arrangement of conduits;
passing the second heat transfer fluid along the third arrangement of conduits from the secondary thermal energy storage device, through the first secondary heat exchanger and applying the heat of compression stored in the secondary thermal energy storage device to the working fluid at the first secondary heat exchanger upstream of the first secondary expansion stage; and
passing the first heat exchange fluid along the second arrangement of conduits, including passing the first portion of the first heat transfer fluid through the first primary heat exchanger and passing the second portion of the first heat transfer fluid through the second primary heat exchanger and applying the heat of compression stored in the primary thermal energy storage device to the working fluid at the first primary heat exchanger and the second primary heat exchanger upstream of the first primary expansion stage and the second primary expansion stage.

21. The sub-system according to claim 9, configured such that the second arrangement of conduits passes through no other heat exchanger and the third arrangement of conduits passes through no other heat exchanger.

22. The sub-system of claim 15, wherein a heat transfer fluid in the first closed loop comprises molten salts, and wherein a heat transfer fluid in the second closed loop comprises a thermal oil or a mixture of thermal oils.

23. The sub-system of claim 17, wherein the secondary thermal energy storage device is configured to store thermal energy between 150° C. and 550° C., and the primary thermal energy storage device is configured to store thermal energy between 150° C. and 350° C.

24. The sub-system according to claim 10, configured such that the second arrangement of conduits passes through no other heat exchanger and the third arrangement of conduits passes through no other heat exchanger.

25. The sub-system according to claim 11, configured such that the second arrangement of conduits passes through no other heat exchanger and the third arrangement of conduits passes through no other heat exchanger.

* * * * *